(12) United States Patent
Anderson et al.

(10) Patent No.: US 9,309,910 B2
(45) Date of Patent: *Apr. 12, 2016

(54) SOLAR MODULE MOUNTING SYSTEM IMPROVEMENTS

(71) Applicant: PANELCLAW GROUP, INC., North Andover, MA (US)

(72) Inventors: David Anderson, Wellesley, MA (US); Vasilije Jovanovic, Winchester, MA (US)

(73) Assignee: PANELCLAW GROUP, INC., North Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,558

(22) Filed: Oct. 6, 2014

(65) Prior Publication Data

US 2015/0021282 A1    Jan. 22, 2015

Related U.S. Application Data

(63) Continuation of application No. 14/090,793, filed on Nov. 26, 2013, now Pat. No. 8,850,756, which is a continuation of application No. PCT/US2013/071015, filed on Nov. 20, 2013.

(60) Provisional application No. 61/728,950, filed on Nov. 21, 2012.

(51) Int. Cl.
*E04D 13/18*    (2014.01)
*F16B 9/02*    (2006.01)
(Continued)

(52) U.S. Cl.
CPC ............... *F16B 9/023* (2013.01); *F24J 2/4636* (2013.01); *F24J 2/525* (2013.01); *F24J 2/5239* (2013.01);
(Continued)

(58) Field of Classification Search
CPC   H01L 31/0422; H01L 31/0482; F24J 2/5258; F24J 2/5201; F16B 9/023
See application file for complete search history.

(56) References Cited

U.S. PATENT DOCUMENTS 4,226,256 A    10/1980 Hawley
4,371,139 A    2/1983 Clark
(Continued)

FOREIGN PATENT DOCUMENTS

EP    0 344 523 B2    12/1989
JP    60-050348    3/1985
(Continued)

OTHER PUBLICATIONS

B. Bienkiewicz and R.N. Meroney: "Wind Effects on Roof Ballast Pavers" Journal of Structural Division, American Society of Civil Engineering. Revised Sep. 1986 and again Jun. 1987 (34 pages).

(Continued)

*Primary Examiner* — Patrick Maestri
(74) *Attorney, Agent, or Firm* — Foley & Lardner LLP; Christopher J. McKenna; Evan M. St. Jean

(57) ABSTRACT

Systems and methods for mounting one or more solar panel modules are disclosed. First and second support structures can be provided. Each support structure can include a lateral support member extending laterally between two post members, and a clamp movably attached to the lateral support member and movable along a length of the lateral support member. Each of the support structures can be configured to be separately mounted to the supporting surface and aligned along an axis to have each lateral support member support a portion of the first solar panel module. The clamp of the first support structure can configured to be moved to a first Airy point of the first solar panel module and the clamp of the second support structure can be configured to be moved to a second Airy point of the first solar panel module.

7 Claims, 38 Drawing Sheets

(51) Int. Cl.
*F24J 2/52* (2006.01)
*F24J 2/46* (2006.01)

(52) U.S. Cl.
CPC .............. *F24J 2/5256* (2013.01); *F24J 2/5258* (2013.01); *F24J 2002/5216* (2013.01); *F24J 2002/5292* (2013.01); *Y10T 29/49826* (2015.01); *Y10T 403/3906* (2015.01)

(56) References Cited

U.S. PATENT DOCUMENTS

| | | | |
|---|---|---|---|
| 4,966,631 | A | 10/1990 | Matlin et al. |
| 5,125,608 | A | 6/1992 | McMaster et al. |
| 5,143,556 | A | 9/1992 | Matlin |
| 5,228,924 | A | 7/1993 | Barker et al. |
| 5,924,248 | A | 7/1999 | Cox et al. |
| 7,481,211 | B2 | 1/2009 | Klein |
| 7,574,842 | B2 | 8/2009 | Russell |
| 7,921,843 | B1 | 4/2011 | Rawlings |
| 8,276,330 | B2 | 10/2012 | Harberts et al. |
| 8,572,909 | B2 | 11/2013 | Rivera et al. |
| 2008/0302928 | A1* | 12/2008 | Haddock ................... 248/205.1 |
| 2010/0288337 | A1 | 11/2010 | Rizzo |
| 2011/0253190 | A1* | 10/2011 | Farnham, Jr. ................. 136/244 |
| 2012/0255597 | A1* | 10/2012 | Bragagna et al. ............. 136/251 |

FOREIGN PATENT DOCUMENTS

| | | |
|---|---|---|
| KR | 101110861 | 2/2012 |
| WO | WO-94/00650 | 1/1994 |
| WO | WO-2011/058559 | 5/2011 |

OTHER PUBLICATIONS

Bhaduri, S. and Murphy, L.M.: "Wind Loading on Solar Collectors" prepared for the U.S. Dept. of Energy for contract No. DE-ACO2-83CH10093, Golden, CO., Jun. 1985 (50 pages).

Chevalier, H.L. and Norton, D.J.: "Wind Loads on Solar Collector Panels and Support Structure" sponsored by the U.S. Dept. of Energy contract No. EV-76-S-05-5130, Oct. 1979 (98 pages).

Cochran, Leighton S., "Influence of Porosity on the Mean and Peak Wind Loads for Three Concentrator Photovoltaic Arrays" Colorado State University, Fort Collins, CO 1986 (14 pages).

Delmarva Power and Light Co.: Development of a Dispatchable PV Peak Shaving System; Prepared for the US Dept of Energy Cooperative Agreement No. DE-FC-93CH10569. Oct. 1995 (77 pages).

Farrington, Robert and Kiss Cathcart Anders Architects, P.C.: Building Integrated Photovoltaics from the National Renewable Energy Laboratory for the U.S. Dept. of Energy under Contract No. DE-AC36-83CH10093, Jan. 1993 (64 pages).

Frantzis, Lisa, et al.:Building-Integrated Photovoltaics (BIPV) Analysis and US Market Potential for Building Equipment Div., US Dept of Energy Contract No. DE-AC01-90CE23821 Feb. 1995 (176 pages).

Fuentes, Martin: "Simplified Thermal Model for Flat-Plate Photovoltaic Arrays" Prepared by Sandia National Laboratories, Albuquerque, NM, May 1987 (60 pages).

Hersch, Paul; Strawn, Noni; Piekarski, Dick; Cook, Gary: "Photovoltaics for Residential Applications" Technical Information Branch, Solar Energy Research Institute, published Feb. 1984 (23 pages).

International Search Report and Written Opinion for PCT Appl. Ser. No. PCT/US2013/071015 dated Jul. 31, 2014.

Kern, Dr. Edward C. Jr., Ascension Technology: "Low-Cost PV Array Mounting for Flat-roof Buildings" from the Third International Workshop on Photovoltaics in Buildings, Lincoln Center, MA (3 pages).

Kern, Edward C. Jr. and Russell, Miles C.: Array Designs for Flat-Roof Buildings; Retrieved from the Internet, 1993.

Kern, Edward C., Jr. and Russell, Miles C.: Rotating Shadow Band Pyranometer Irradiance Monitoring for Photovoltaic Generation Estimation from the 22nd IEEE Photovoltaic Specialists Conference-1991 vol. 1, Las Vegas, NV (7 pages).

Murphy, L.M.: "Wind Loading on Tracking and Field Mounted Solar Collectors", prepared by Solar Energy Research Institute, Golden, CO. for the U.S. Dept. of Energy, Dec. 1980 (10 pages).

Peterka, J.A., Sinou, J.M., and Cermak, J.E.: "Mean Wind Forces on Parabolic-Trough Solar Collectors" prepared for Sandia National Laboratories under Contract No. 13-2412, May 1980 (121 pages).

PV Specifications retrieved from the internet by Greg Pearen, Mar. 23, 2001 (11 pages).

Radu, Adrian; Axinte, Elena; and Theohari, Christina: "Steady Wind Pressures on Solar Collectors on Flat-Roofed Buildings" Journal of Wind Engineering and Industrial Aerodynamics, 23 (1986) 249-258 Elevator Science Publishers B.B., Amsterdam (10 pages).

Russell, M.C.: Solar Photovoltaic Systems for Residences in the Northeast, Lexington, MA, 1980 (7 pages).

Russell, Miles C. and Kern, Edward C. Jr.: "Stand-Off Building Block Systems for Roof-Mounted Photovoltaic Arrays Sandia Contract" 58-8796. Retrieved through Wisconsin Tech Search. Jun. 1986 (212 pages).

Siemens Solar Electric Modules Installation Guide, 1990 (8 pages).

Stafford, Byron: "Design Considerations and Performance of Maspeth a-Si PV System" American Institute of Physics, 1994 (8 pages).

Stiebel Eltron GmbH & Co.: KG: "Mount for the installation of Solar Panels" retrieved from German Patent Office, published Aug. 26, 1982 (9 pages).

Technical Information Branch, Solar Energy Research Institute: "Photovoltaics for Residential Applications" operated for the U.S. Dept. of Energy by Midwest Research Institute, Golden, CO, Feb. 1984 (23 pages).

Tieleman, H.W. et al.: "An Investigation of Wind Loads on Solar Collectors" prepared for the U.S. Dept. of Commerce National Bureau of Standards for contract No. EO-A01-78/3605, Jan. 1980 (173 pages).

Toggweiler, Peter, et. al.: Development of a flat-roof integrated photovoltaic system (SOFREL) Zurich, Switzerland, Mar. 1994 (189 pages).

US Notice of Allowance for U.S. Appl. No. 14/090,793 dated Jan. 27, 2014.

US Notice of Allowance for U.S. Appl. No. 14/090,793 dated Jun. 4, 2014.

* cited by examiner

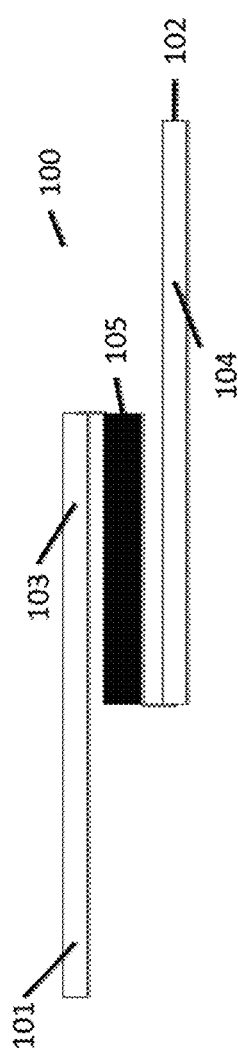
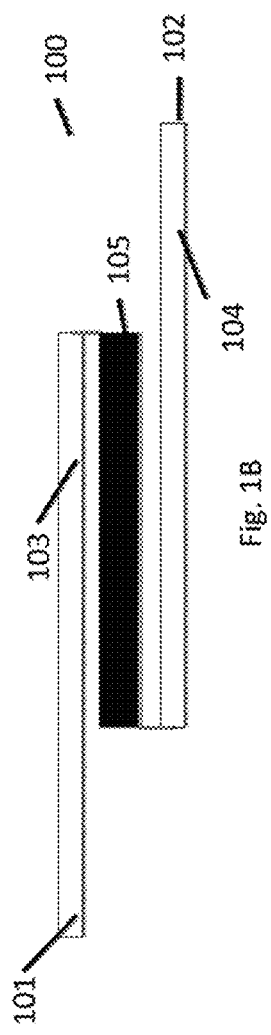
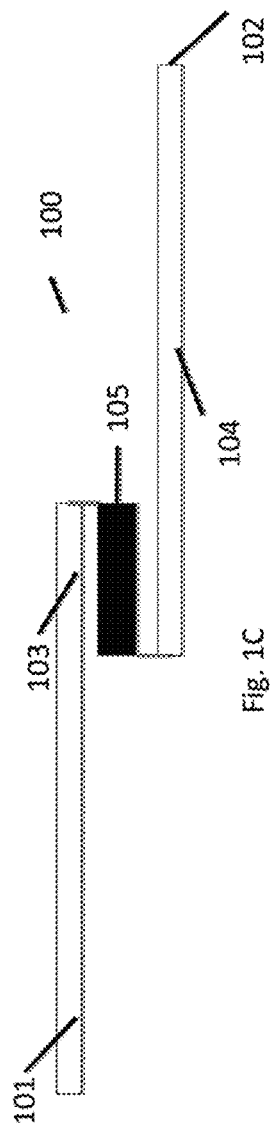

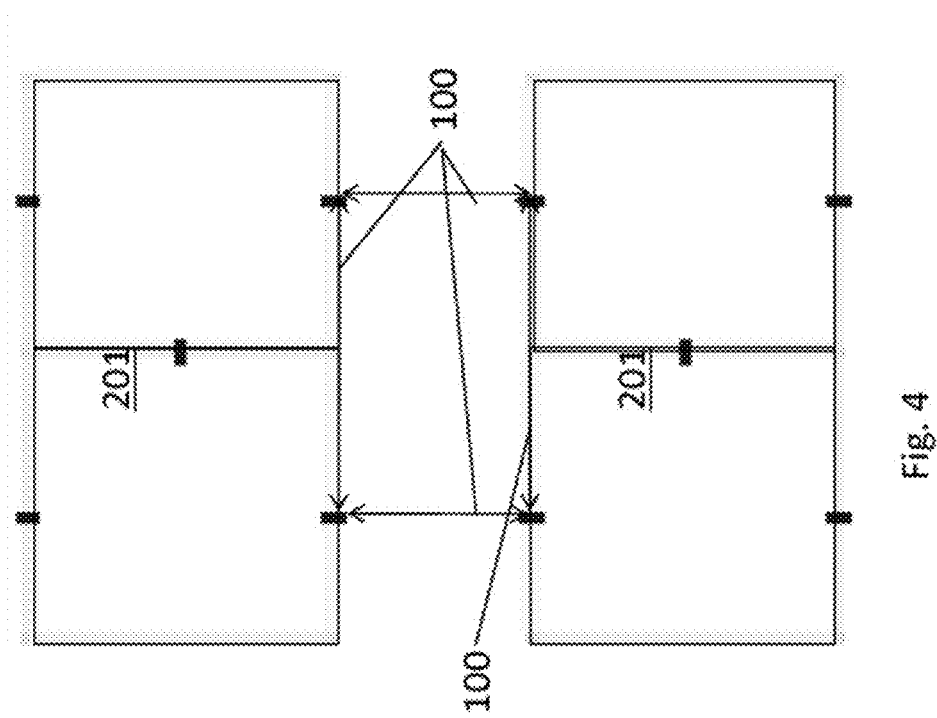

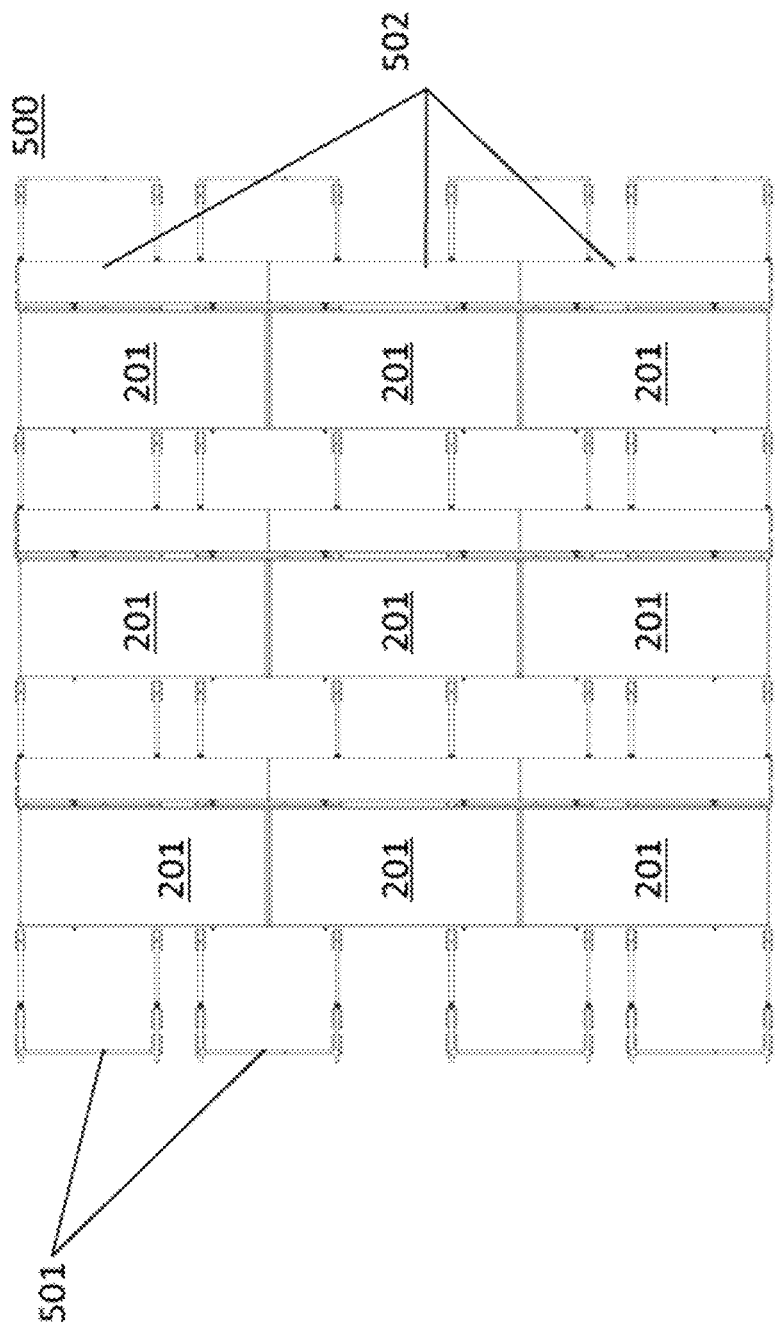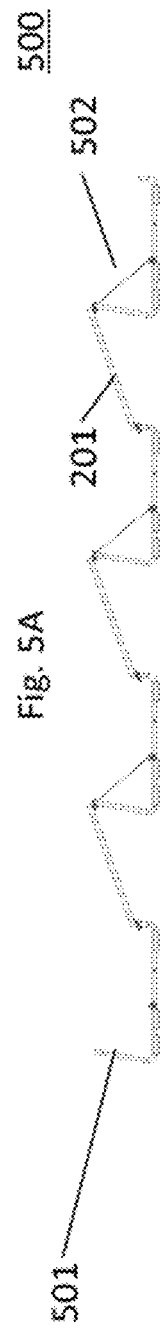
Fig. 5A
Fig. 5B

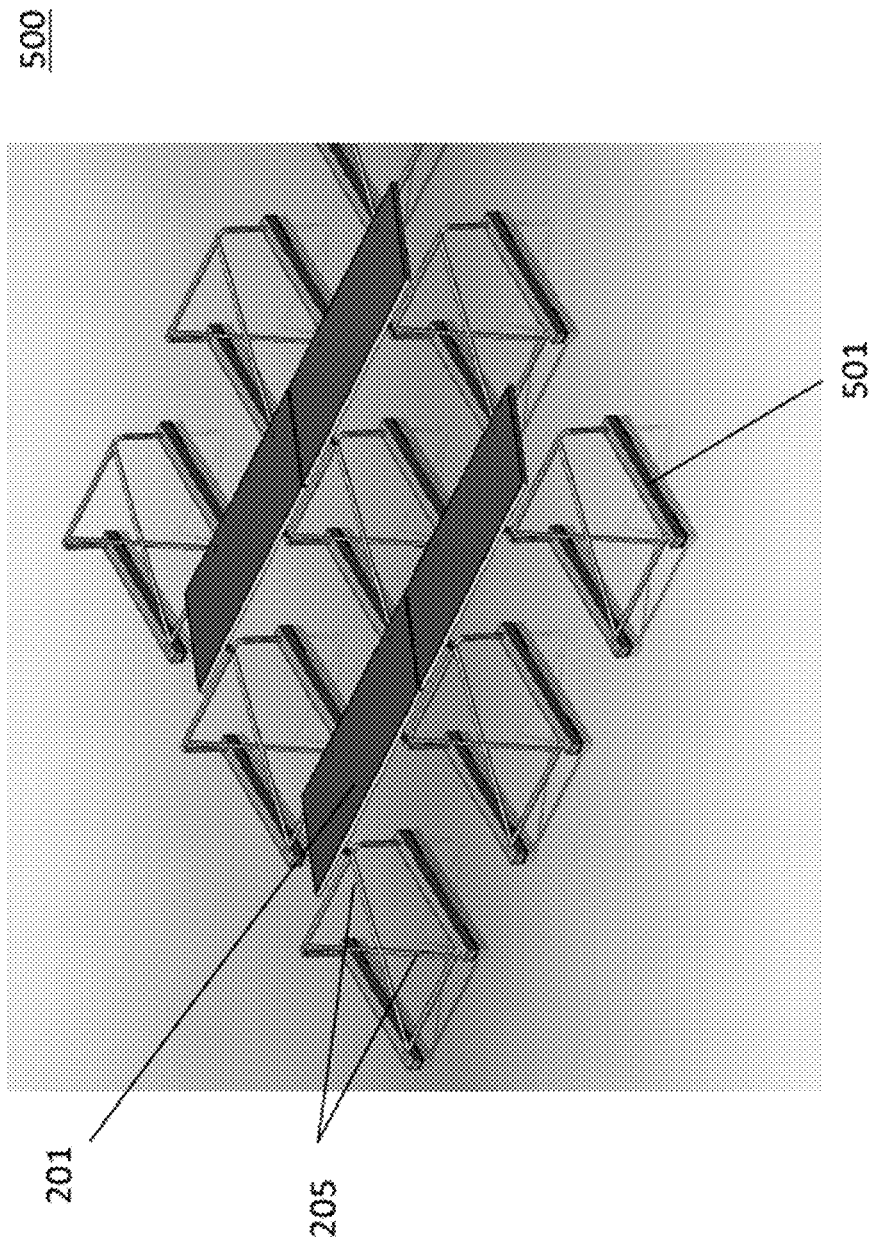

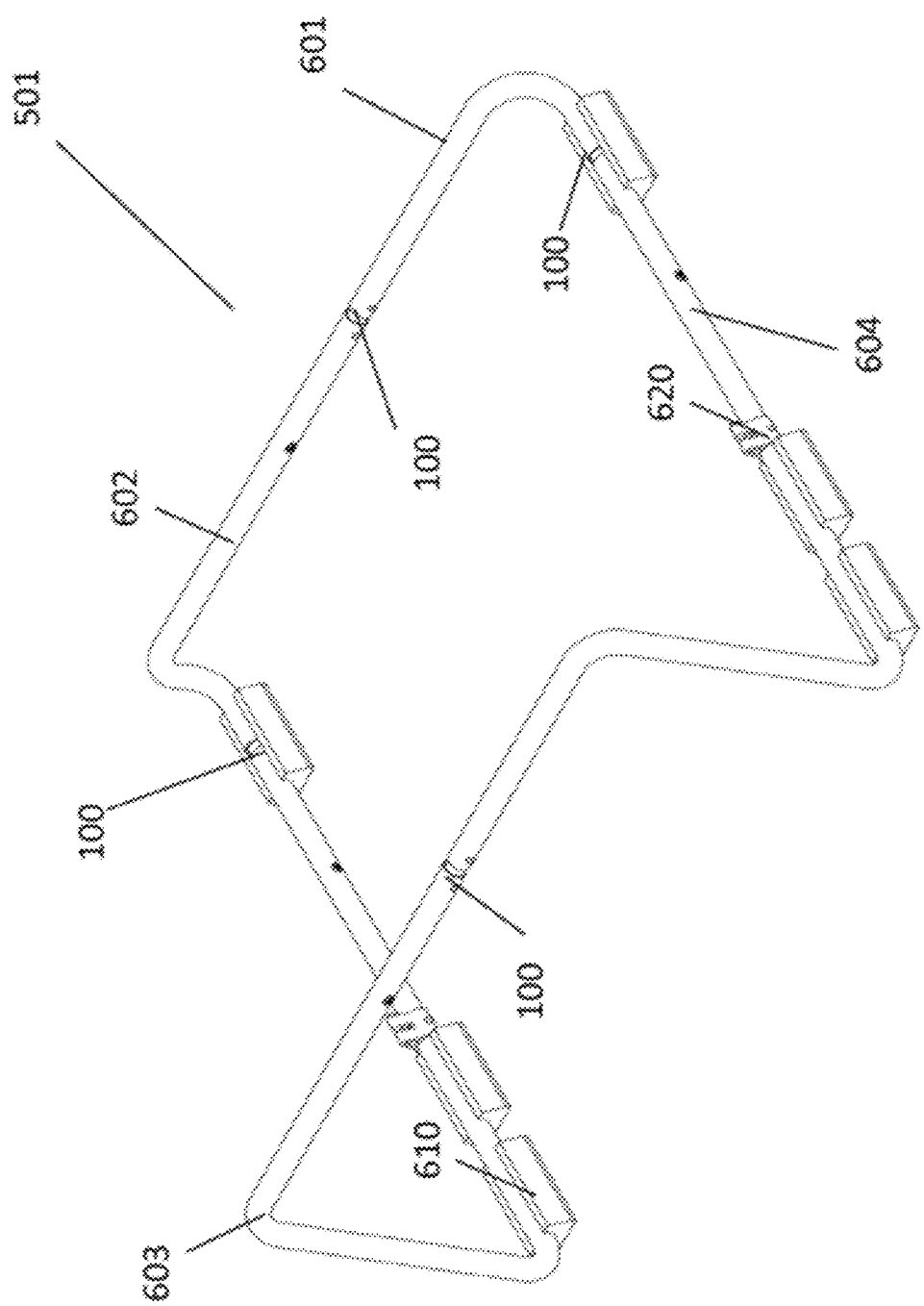

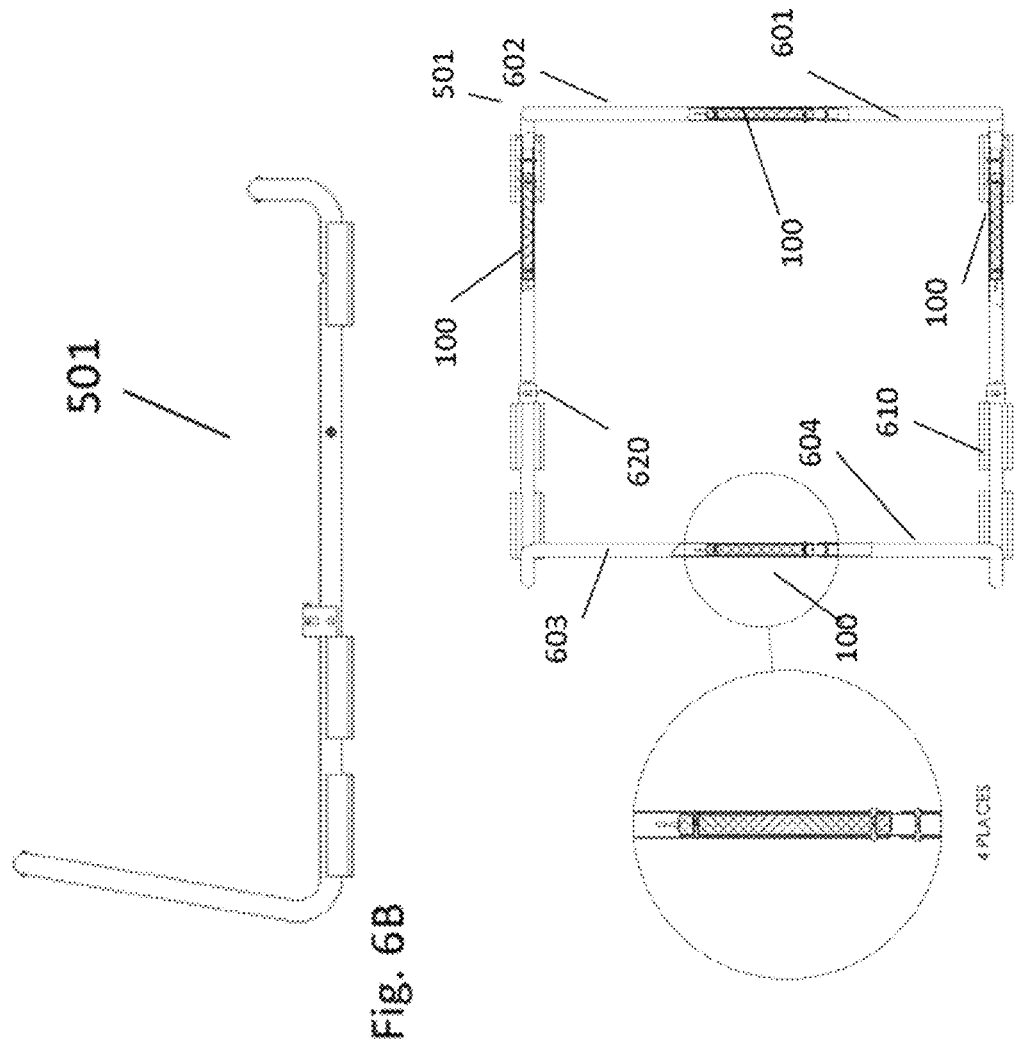

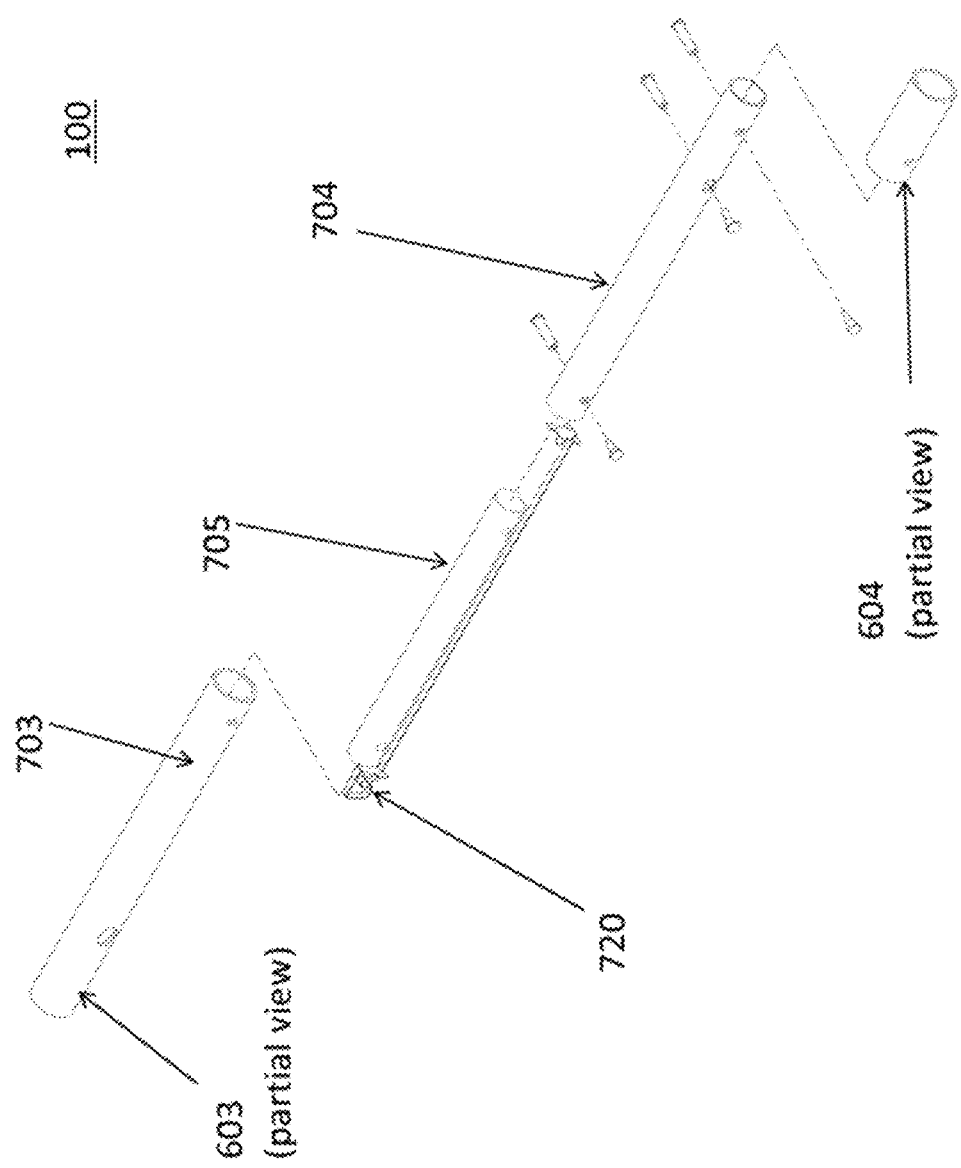

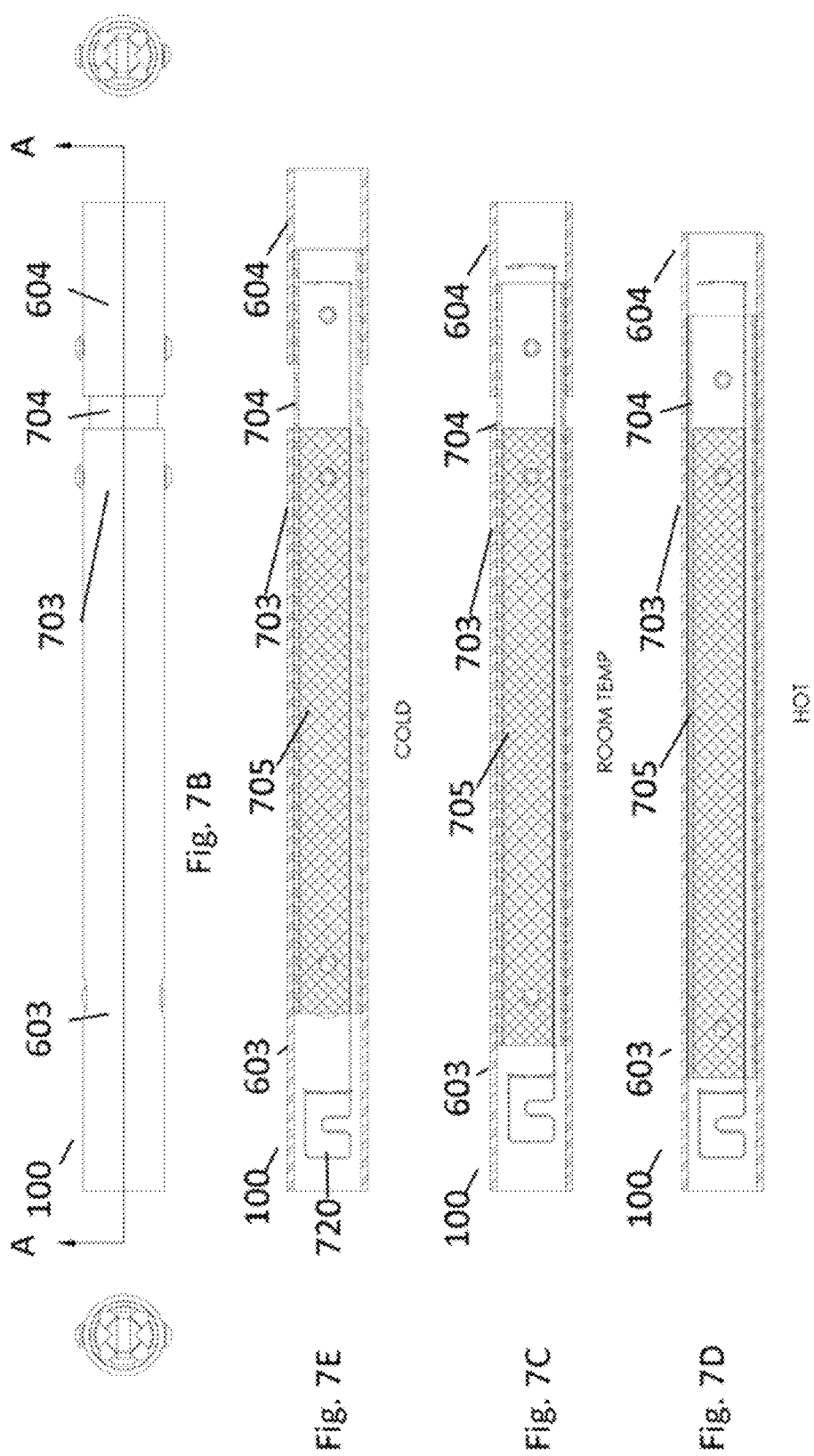

| Thermal Compensator Sizing - Inputs Sheet | | | | |
|---|---|---|---|---|
| Description | Variable | Value | | Material |
| | | | | Steel |
| | | | | Unkn. |
| | | | | Aluminum |
| CTE - Kodiak Support | CTE1 | 0.0000067 | | |
| CTE - Thermal Compensator | CTE2 | 0.0000111 | | |
| CTE - panel frame | CTE-p | 0.0000131 | | |
| Gap between panels | A1 | 0.5 | in | |
| Support location (Airy point) | AP | 220 | | |
| Shading ratio (Y/B1) | SR | 1 | | |
| Low Temp | TL | 0 | °F | |
| High Temp | TH | 180 | °F | |
| Temp Differential | dT | 180 | °F | |
| Strain limit | SL | 10 | | |

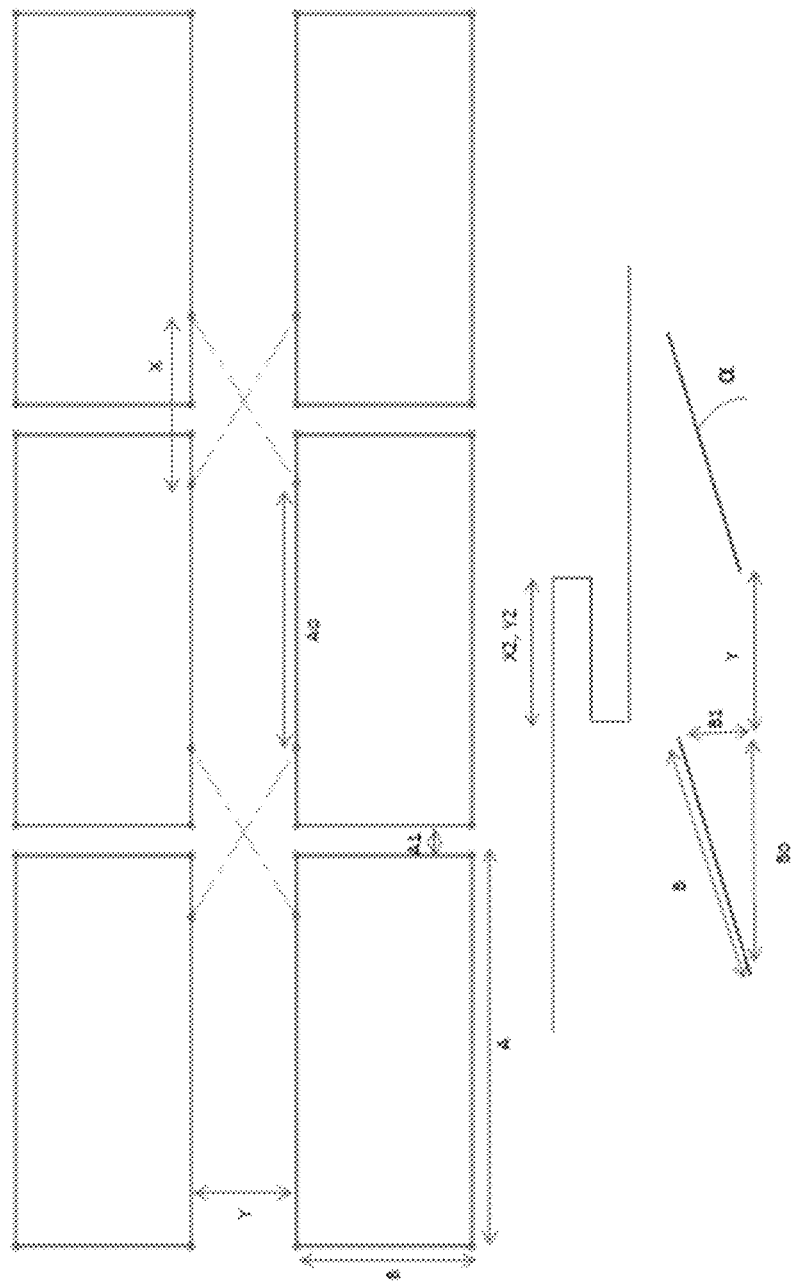

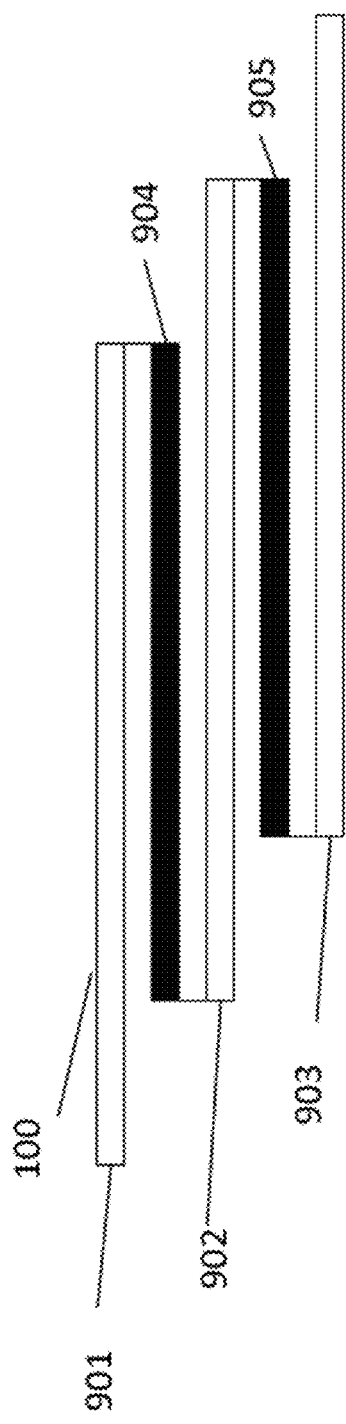
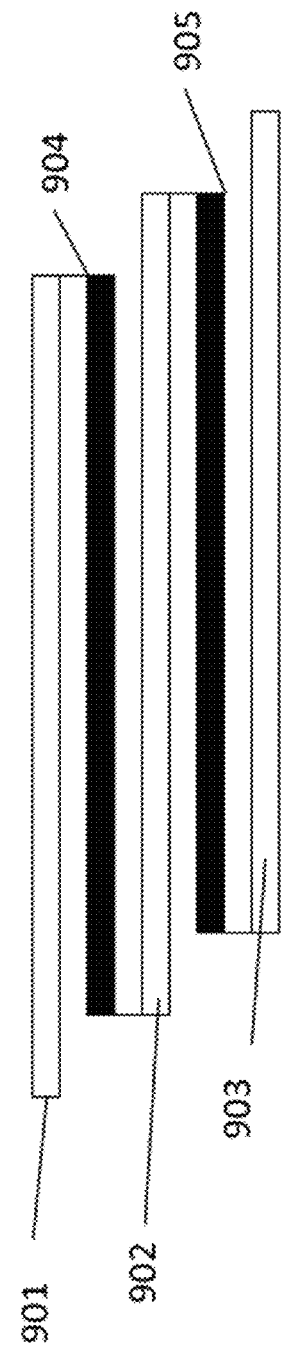
Fig. 9A
Fig. 9B

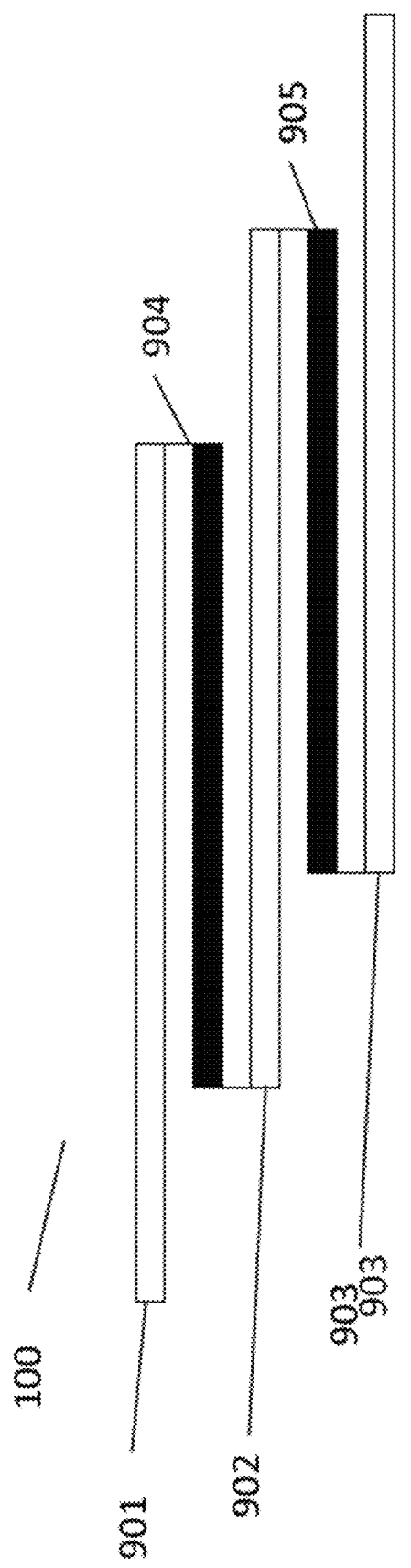

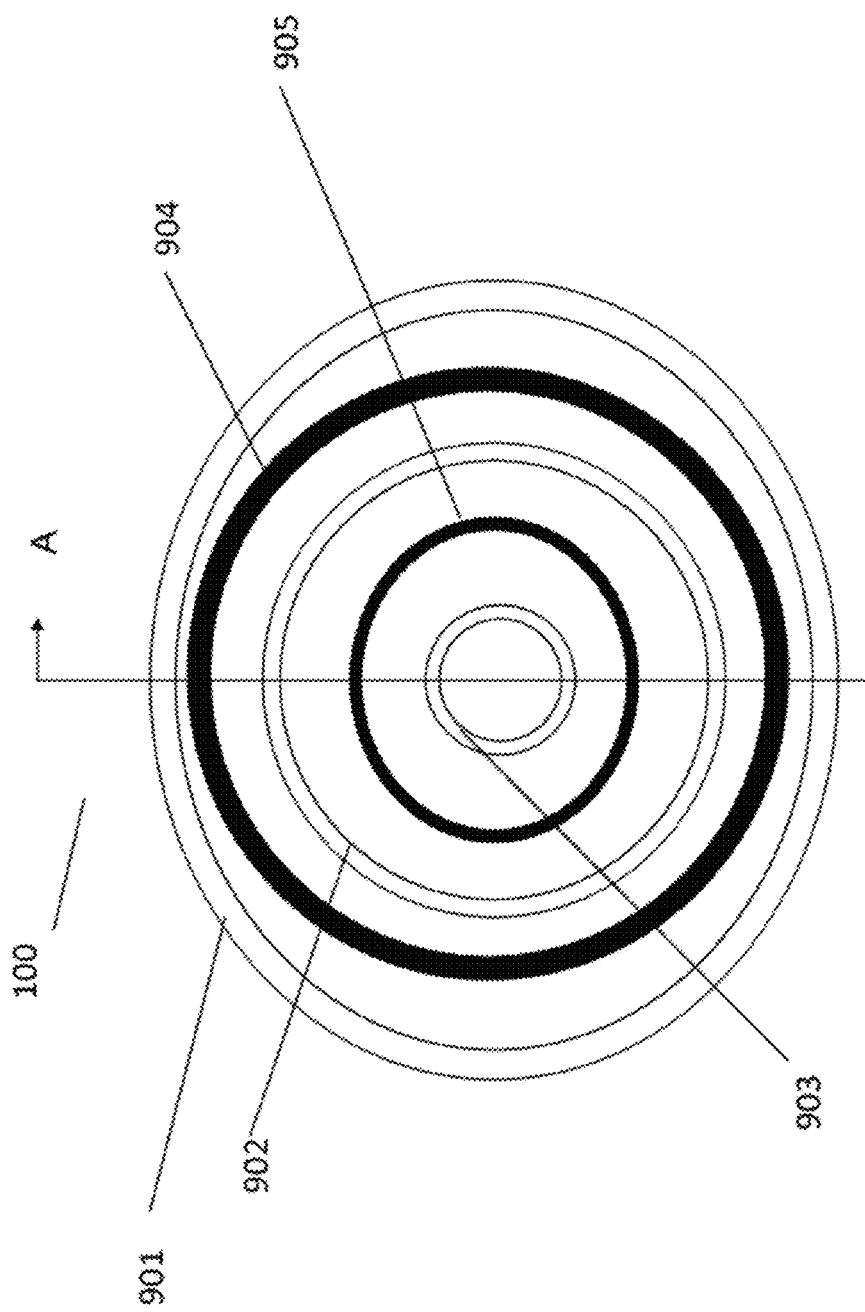

SOLAR MODULE MOUNTING SYSTEM IMPROVEMENTS

CROSS REFERENCE TO RELATED APPLICATIONS

The current application is a continuation of and claims priority to U.S. patent application Ser. No. 14/090,793, filed Nov. 26, 2013, which is a continuation of and claims priority to International Patent Application No.: PCT/US2013/071015, filed Nov. 20, 2013, which claims priority to and the benefit of U.S. Provisional Patent Application Ser. No. 61/728,950, filed Nov. 21, 2012, each of which are incorporated by reference in their entirety. The current application is related to U.S. Provisional Application No. 61/581,894 filed Dec. 30, 2011, U.S. Provisional Patent Application Ser. No. 61/229,622 filed Jul. 29, 2009; U.S. Provisional Patent Application Ser. No. 61/506,490 filed Jul. 11, 2011; U.S. patent application Ser. No. 12/056,791 filed Mar. 27, 2008; U.S. patent application Ser. No. 12/846,259 filed Jul. 29, 2010; and U.S. Provisional Patent Application Ser. No. 61/506,490 filed Jul. 11, 2011, the entire contents of each of which are incorporated herein by reference.

BACKGROUND

Solar (e.g., photovoltaic) modules are often manufactured in the form of flat rigid structures. To facilitate the performance of the function of generating electricity, solar modules may be mounted in an area exposed to the sun or other source of light. Often, it is desirable to mount solar modules outdoors at an angle from the horizontal so that they will more directly face the sun during peak daylight hours as opposed to modules mounted horizontally. In some applications, it may be desirable to mount a number of solar modules together in an array in order to combine the power generation capabilities of the individual modules. In many instances, it may be desirable that mounting systems for solar module arrays retain the solar modules in place. This may be accomplished by attaching the solar modules to one another in a mounting system and/or by mounting the modules to the mounting system.

For example, U.S. Patent Application Publication No. 2007/0133474 to Mascolo et al. describes a supported solar module assembly including a solar module comprising a solar module and solar module supports including module supports having support surfaces supporting the module, a module registration member engaging the solar module to position the solar module on the module support, and a mounting element. U.S. Pat. No. 6,534,703 to Dinwoodie describes a solar module assembly for use on a support surface comprising a base, a solar module, a multi-position module support assembly, and a deflector.

Solar module assemblies are typically subjected to thermal stress. Thermal stress is a mechanical stress induced in a body when some or all of its parts are not free to expand or contract in response to changes in temperature. For example, on solar module arrays, thermal stresses may generate forces on the modules and the mounting system retaining the modules. In some cases, these forces may cause the modules and/or mounting system to rotate, translate, or otherwise move relative to the underlying surface (e.g., a rooftop). In some cases, thermal expansion and contraction may slide entire solar module arrays across the roof, potentially damaging the roof surface, the mounting system, the modules, etc. Thermal expansion and contraction cycling may result in premature solar module failures, mounting system failures, etc.

SUMMARY

The systems and methods described herein relate to arrays of solar panel modules. In some systems, a module mounting assembly used to support the array of solar panel modules can include thermal growth compensators. The thermal growth compensators can expand and contract in directions opposed to the directions of expansion and contraction of other structural elements, in response to changes in temperature. For example, the lengths of the thermal growth compensators can expand in response to a decreasing temperature and contract in response to increasing temperature. This can substantially reduce the thermal stress on the overall system.

A process for installing an array of solar panel modules is also disclosed. A plurality of support structures can be installed, with each support structure separate and independent from the other support structures. The support structures can be installed in rows to support the array of solar panel modules. In some implementations, the spacing between adjacent support structures in a given row can be adjusted in order to avoid obstacles on the supporting surface. The support structures may be ballasted or may include anchors that penetrate the supporting surface. The solar panel modules can be supported at their Airy points above the supporting surface.

In one aspect, a system for mounting a solar panel module above a surface is disclosed. The system can include a first support structure and a second support structure. Each of the first support structure and the second support structure can include a first lateral support member extending laterally between two post members a first predetermined height above a supporting surface. The first lateral support member can be configured to support a first portion of a first solar panel module. Each of the first support structure and the second support structure can include a first clamp movably attached to the first lateral support member and movable along a length of the first lateral support member and attached to the first portion of the first solar panel module supported by the first lateral support member. Each of the first support structure and the second support structure can be configured to be separately mounted to the supporting surface and aligned along a first axis to have each first lateral support member of the first support structure and the second support structure support the first portion of the first solar panel module. The first clamp of the first support structure can be configured to be moved to a first Airy point of the first solar panel module and the first clamp of the second support structure can be configured to be moved to a second Airy point of the first solar panel module for attaching the first portion of the first solar panel module to be supported by each respective lateral support member.

In some implementations, each of the first support structure and the second support structure are configured to not be attached to each other while mounted to the supporting surface.

In some implementations, each of the first support structure and the second support structure are configured to not be attached to each other while supporting the first portion of the first solar panel module.

In some implementations, each of the first support structure and the second support structure include a plurality of connectable steel tubes.

In some implementations, each of the first support structure and the second support structure further include a mounting member to separately mount the respective support structure to the supporting surface.

In some implementations, the first clamp of the first support structure is further configured to be moved to the first Airy point along a first edge of and towards one end of the first portion of the first solar panel module and the first clamp of the second support structure is further configured to be moved to the second Airy point along the first edge of and towards an opposing end of the first portion of the first solar panel module.

In some implementations, the first support structure further includes a second lateral support member extending laterally between two post members a second predetermined height above the supporting surface. The second lateral support member can be configured to support a first portion of a second solar panel module. The first support structure can also include a second clamp movably attached to the second lateral support member and movable along a length of the second lateral support member and attached to the second portion of the second solar panel module supported by the second lateral support member. The second lateral support member can be aligned along a second axis to support the second portion of the second solar panel module. The second clamp of the second lateral support member can be configured to be moved to a first Airy point of the second solar panel module for attaching the second portion of the second solar panel module to be supported.

In some implementations, the system includes a third support structure and a fourth support structure. Each of the third support structure and the fourth support structure can include a first lateral support member extending laterally between two post members a third predetermined height above the supporting surface. The first lateral support member can be configured to support at least a second portion of the first solar panel module. The system can include a first clamp movably attached to the first lateral support member and movable along a length of the first lateral support member and attached to the second portion of the first solar panel module supported by the first lateral support member. Each of the third support structure and the fourth support structure can be configured to be separately mounted to the supporting surface and aligned along a third axis to have each first lateral support member of the third support structure and the fourth support structure support the second portion of the first solar panel module. The first clamp of the third support structure can be configured to be moved to a third Airy point of the first solar panel module and the first clamp of the fourth support structure can be configured to be moved to a fourth Airy point of the first solar panel module for attaching the second portion of the first solar panel module to be supported by each respective lateral support member.

In some implementations, each of the first support structure, the second support structure, the third support structure, and the fourth support structure are configured to not be attached to each other while mounted to the supporting surface.

In some implementations, each of the first support structure, the second support structure, the third support structure, and the fourth support structure are configured to not be attached to each other while supporting the first solar panel module.

In some implementations, a difference between the first predetermined height and the third predetermined height is selected to provide a predetermined angle of support for the first solar panel module relative to the supporting surface.

In some implementations, each of the third support structure and the fourth support structure comprise a plurality of connectable steel tubes.

In some implementations, each of the third support structure and the fourth support structure further include a second mounting member to separately mount the respective support structure to the supporting surface.

In some implementations, the first clamp of the third support structure is further configured to be moved to the third Airy point along a second edge of and towards one end of the second portion of the first solar panel module and the first clamp of the fourth support structure is further configured to be moved to the fourth Airy point along the second edge of and towards an opposing end of the second portion of the first solar panel module. The second edge of the solar panel module can be opposed to the first edge of the first solar panel module.

In another aspect, a method is disclosed for supporting a solar panel module above a surface. The method can include mounting a first support structure to a supporting surface. The first support structure can include a first lateral support member extending laterally between two post members at a first predetermined height above the supporting surface along a first axis. The method can include mounting a second support structure to the supporting surface. The second support structure can include a second lateral support member extending laterally between two post members at the first predetermined height above the supporting surface along the first axis.

The method can include moving a first clamp attached to the first lateral support member of the first support structure to a first Airy point of a first solar panel module. The first clamp can be configured to move along a length of its respective lateral support member. The method can include attaching the first clamp of the first lateral support member to the first Airy point of the solar panel module to have the first lateral support member support at least a portion of the solar panel module. The method can include moving a second clamp attached to the second lateral support member of the second support structure to a second Airy point of the first solar panel module. The second clamp can be configured to move along a length of its respective lateral support member. The method can include attaching the second clamp of the second lateral support member to the second Airy point of the solar panel module to have the second lateral support member support at least a portion of the solar panel module.

In some implementations, mounting the first support structure to the supporting surface and mounting the second support structure to the supporting surface further include mounting the first support structure and the second support structure such that the first support structure and the second support structure are not attached to each other while mounted to the supporting surface.

In some implementations, mounting the first support structure to the supporting surface and mounting the second support structure to the supporting surface further include mounting the first support structure and the second support structure such that the first support structure and the second support structure are not attached to each other while supporting the first portion of the first solar panel module.

In some implementations, mounting the first support structure to the supporting surface and mounting the second support structure to the supporting surface further comprise mounting a plurality of connectable steel tubes to the supporting surface.

In some implementations, the method also can include installing a first mounting member and a second mounting member in the supporting surface. Each of the first mounting member and the second mounting member can be configured to separately mount a respective support structure to the supporting surface.

In some implementations, the method also can include mounting a third support structure to the supporting surface. The third support structure can include a third lateral support member extending laterally between two post members at a second predetermined height above the supporting surface along a second axis. The method can include mounting a fourth support structure to the supporting surface. The fourth support structure can include a fourth lateral support member extending laterally between two post members at the second predetermined height above the supporting surface along the second axis. The method can include moving a third clamp attached to the third lateral support member of the third support structure to a third Airy point of the first solar panel module. The third clamp can be configured to move along a length of its respective lateral support member. The method can include attaching the third clamp of the third lateral support member to the third Airy point of the solar panel module to have the third lateral support member support at least a portion of the solar panel module. The method can include moving a fourth clamp attached to the lateral support member of the fourth support structure to a fourth Airy point of the first solar panel module. The fourth clamp can be configured to move along a length of its respective lateral support member. The method can include attaching the fourth clamp of the fourth lateral support member to the fourth Airy point of the solar panel module to have the fourth lateral support member support at least a portion of the solar panel module.

In various embodiments, any of the above described devices, techniques, systems, elements, steps, etc. may be used, either alone, or in any suitable combination.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing.

FIG. 1A is a schematic of a thermal growth compensator at a baseline temperature.

FIG. 1B is a schematic of the thermal growth compensator of FIG. 1A at a temperature warmer than the baseline temperature.

FIG. 1C is a schematic of the thermal growth compensator of FIG. 1A at a temperature colder than the baseline temperature.

FIG. 4 is a schematic of another embodiment of a solar module mounting system featuring thermal growth compensators shown in a top down view.

FIG. 5A shows a top down view of a solar module mounting system featuring thermal growth compensators integrated in support structures.

FIG. 5B shows a side view of a solar module mounting system featuring thermal growth compensators integrated in support structures.

FIG. 5C shows a perspective view of a solar module mounting system featuring thermal growth compensators integrated in support structures in a transverse configuration.

FIG. 6A shows a perspective view of a support structure from the solar module mounting system of FIGS. 5A and 5B.

FIG. 6B shows a side view of a support structure from the solar module mounting system of FIGS. 5A and 5B.

FIG. 6C shows a top down view of a support structure from the solar module mounting system of FIGS. 5A and 5B. An inset shows a detailed view of a thermal growth compensator included in the support structure.

FIG. 7A is an exploded view of a thermal growth compensator (TGC) included in the support structure shown in FIGS. 6A-6C.

FIG. 7B shows a side view of a thermal growth compensator included in the support structure shown in FIGS. 6A-6C. Head on views are shown in insets to the left and the right of the side view.

FIG. 7C is a cross sectional of the thermal growth compensator of FIG. 6B view taken along the section AA. The compensation device is at a baseline temperature.

FIG. 7D is a cross sectional of the thermal growth compensator of FIG. 6B view taken along the section AA. The thermal growth compensator is at a temperature warmer than the baseline temperature.

FIG. 7E is a cross sectional of the thermal growth compensator of FIG. 6B view taken along the section AA. The thermal growth compensator is at a temperature colder than the baseline temperature.

FIGS. 8A-8C illustrate a method of choosing suitable designs for the thermal growth compensators in an exemplary embodiment of the mounting system shown in FIGS. 5A-7E. FIG. 8A shows a table of input parameters characterizing the system. FIG. 8B is a look up table which provides suitable design parameters for the thermal growth compensators. FIG. 8C is a schematic illustrating the correspondence of parameter labels from FIGS. 8A and 8B to aspects of the mounting system and corresponding array of modules.

FIG. 9A is a schematic of an alternate embodiment of a thermal growth compensator at a baseline temperature.

FIG. 9B is a schematic of the thermal growth compensator of FIG. 9A at a temperature warmer than the baseline temperature.

FIG. 9C is a schematic of the thermal growth compensator of FIG. 9A at a temperature colder than the baseline temperature.

FIG. 10A is a head on view of a thermal growth compensator.

DETAILED DESCRIPTION

Figure 2A:
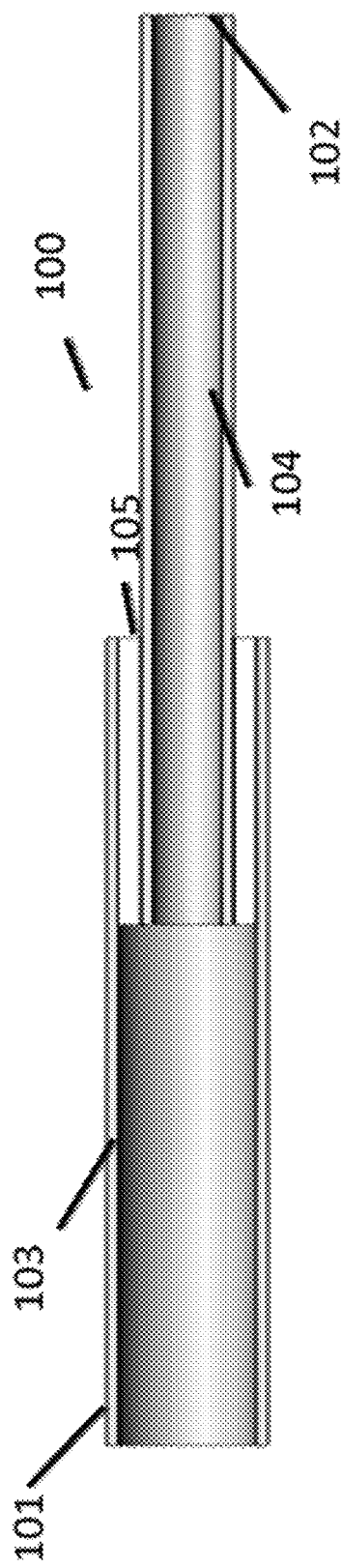
FIG. 2A is schematic of a tubular thermal growth compensator shown in cross section.

For purposes of reading the description of the various embodiments below, the following descriptions of the sections of the specification and their respective contents may be helpful:

Section A describes embodiments of systems and methods for compensating for thermal expansion and contraction to reduce overall strain in an array of solar panel modules.

Section B describes embodiments of systems and methods for installing an array of solar panel modules above a supporting surface.< >

A. Systems and Methods for Compensating for Thermal Expansion and Contraction to Reduce Overall Strain in an Array of Solar Panel Modules FIG. 1A shows a thermal growth compensator 100 at a baseline temperate. The thermal growth compensator 100 extends from a left end 101 to a right end 102. The thermal growth compensator 100 includes a left portion 103, a right portion 104, and a central portion 105. The right end of the left portion 103 is connected to the right end of the central portion 105. The left end of the right portion 104 is attached to the left end of the central portion 105. The central portion, 105 is made of a material which differs from the material of the left and right portions 103, 104, such that the coefficient of thermal expansion (CTE) of the central portion 105 is greater than the coefficient of thermal expansion of the left and right portions 103, 104. For example, in various embodiments, the CTE of the central portion 105 may be at least 2, at least 3, at least 4, at least 5, or more times the CTE of either of the left and right portions 103, 104. For example in various embodiments, the CTE of the central portion 105 may be in the range of 2-100 times the CTE of either of the left and right portions 103, 104, or any subrange thereof.

FIG. 1B shows a thermal growth compensator 100 at a temperature greater than the baseline temperature. Each of the left, right, and central portions 103, 104, 105 expand in response to the temperature increase. However, because the CTE of the central portion 105 is greater than that of the other portions 103, 104, the left and right ends 101 and 102 of the thermal growth compensator 100 move towards each other, thereby reducing the overall length of the device along the direction between the ends 101 and 102.

FIG. 1C shows a thermal growth compensator 100 at a temperature less than the baseline temperature. Each of the left, right, and central portions 103, 104, 105 contract in response to the temperature decrease. However, because the CTE of the central portion 105 is greater than that of the other portions 103, 104, the left and right ends 101 and 102 of the thermal growth compensator 100 move away from each other, thereby increasing the overall length of the device along the direction between the ends 101 and 102.

Accordingly, the thermal growth compensator 100 exhibits thermal expansion and contraction in the direction opposite of that of normal materials. That is, the length of the thermal growth compensator 100 decreases with increasing temperature and increases with decreasing temperature. In various embodiments (e.g., as given in the examples below), this behavior may be used to compensate for thermal expansion and contraction of various objects. For example, the thermal growth compensator 100 may be used as a mechanical link between two objects. The thermal expansion/contraction of the thermal growth compensator 100 can work in the opposite sense of the thermal expansion/contraction of the objects. Accordingly, the thermal growth compensator 100 may reduce or eliminate the thermal stress and/or strain on the overall system thereby providing thermal compensation.

In contrast, a conventional rigid link between the objects would not provide thermal compensation. Rather, a conventional link would expand and contract in the same sense as the objects, exacerbating the problem of thermal stress and strain.

In various embodiments, the compensation provided by the thermal growth compensator 100 can be "tuned" by suitable choice of the materials, sizes, and arrangement of the portions 103, 104, 105. That is, the thermal expansion/contraction properties of the thermal growth compensator 100 can be adjusted based on the known properties (size, shape, CTE, etc.) of an attached object or objects to provide a desired level of thermal compensation. The overall CTE of the compensator may be tuned to be positive, negative, or zero, by suitable choice of material, geometry, etc.

Note that in various embodiments, the thermal growth compensator 100 provides passive compensation. That is, suitable compensation is provided by matching the properties of the thermal growth compensator 100 to that of the attached object or objects. No dynamic monitoring (e.g., using temperature or other sensors) or adjustment (e.g., using one or more actuators) is required. Moreover, in various embodiments, the thermal growth compensator 100 may be rigid, or substantially rigid, providing thermal compensation without the need for flexible elastomeric elements (e.g., expansion joints featuring flexible members familiar from the use in construction and plumbing applications).

In some embodiments, the left and right portions 103, 104 may be made of a metallic material, such as aluminum, steel (e.g., cold rolled low carbon steel), etc. In some embodiments, the central portion 105 may be made of a non-metallic material such as a plastic, a polymer, etc. In some embodiments, the central portion may be made of a metallic material having a CTE different from that of the left and right portions 103, 104 (e.g., as described in greater detail below). In various embodiments, any suitable materials may be used.

Note that for some applications, it may be desirable to use a material for the central portion that has a CTE less than the CTE of the left and right portions 103, 104.

In various embodiments, materials exhibiting a negative CTE over at least some temperatures (e.g., quartz or cubic zirconium tungstate) may be used.

FIG. 2A shows another embodiments of the thermal growth compensator 100. As shown, the left and right portions 103, 104 are metal tubes. The central portion 105 is a plastic tube. The left portion 103 is disposed about the central portion 105, with the right end of the left portion 103 attached to the right end of the central portion 105. The central portion 105 is disposed about at least part of the right portion 104. The left end of the right portion 104 is attached to the left end of the central portion 105.

As was the case in the embodiments shown in FIGS. 1A-1C, the central portion 105 is made of a material which differs from the material of the left and right portions 103, 104, such that the CTE of the central portion 105 is greater than the coefficient of thermal expansion of the left and right portions 103, 104. As the temperature of the thermal growth compensator 100 increases, the central portion expands at a faster rate than the left and right portions 103, 104, causing the left and right ends 101, 102 of the thermal growth compensator 100 move towards each other, thereby reducing the overall length of the device along the direction between the ends 101, 102. That is, with increasing temperature, the nested tubular structure of the thermal growth compensator 100 "telescopes" in on itself, to reduce the total length of the device between the ends 101 and 102.

As the temperature of the thermal growth compensator 100 decreases, the central portion contracts at a faster rate than the left and right portions 103, 104, causing the left and right ends 101 and 102 of the thermal growth compensator 100 move away each other, thereby increasing the overall length of the device along the direction between the ends 101, 102. That is, with decreasing temperature, the nested tubular structure of the thermal growth compensator 100 "telescopes" out, to increase the total length of the device between the ends 101, 102.

Figure 2B:
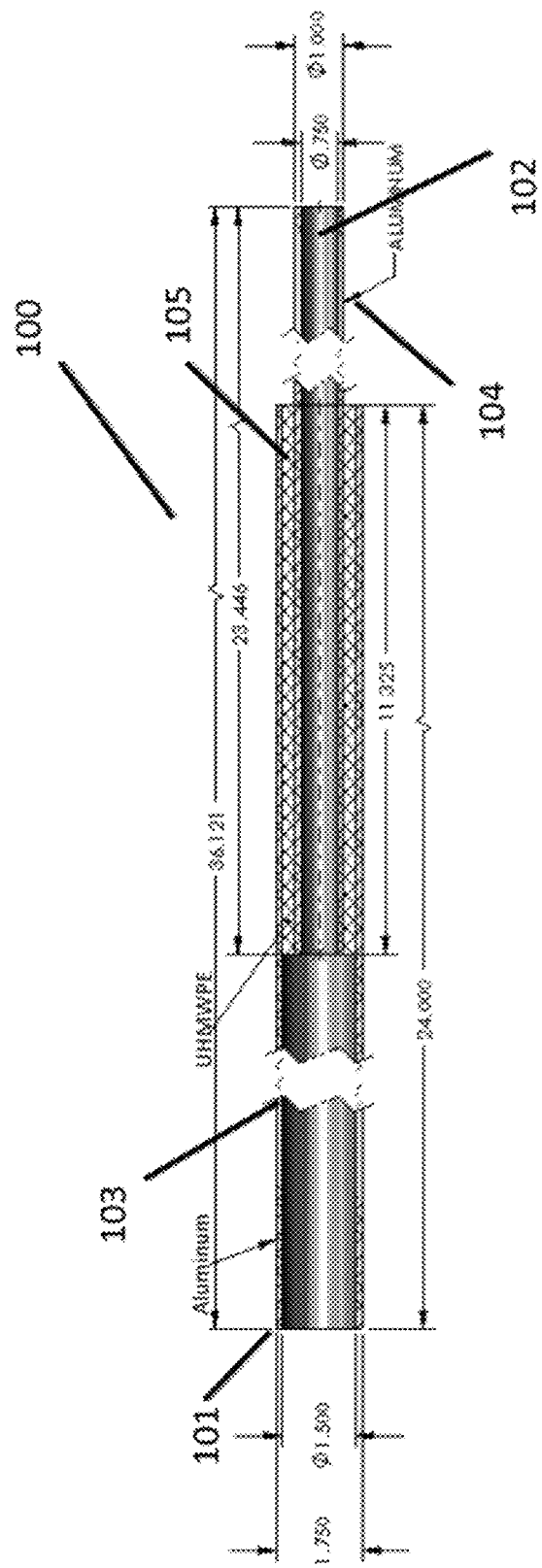
FIG. 2B is schematic of a tubular thermal growth compensator shown in cross section, with exemplary dimensions in arbitrary units and exemplary material choices.

FIG. 2B shows a dimensional drawing of an embodiments of a thermal growth compensator 100 featuring the nested tubular structure shown in FIG. 2A. Although exemplary dimensions are shown, in various embodiments, other dimensions may be used.

In this embodiment, the left and right portions 103 and 104 are aluminum tubes. The central portion 105 is a tube of ultra high molecular weight polyethylene (UHMW). However, it is to be understood that in various embodiments other materials may be used. For example, the central portion 105 may include any suitable material, including: a plastic, a polymer, polyvinyl carbonate (PVC), polyethylene (PE), high density polyethylene (HDPE), any metal or combination of metals having a CTE other than that of the left and right portions 103 and 104 etc. In various embodiments, the central portion may include a material having a CTE greater than about 10 ppm/F (part per million per degree Fahrenheit), 20 ppm/F 30 ppm/F, 40 ppm/F, 50 ppm/F, 60 ppm/F, 70 ppm/F, 80 ppm/F, 90 ppm/F, 100 ppm/F, or more, e.g., in the range of 50-150 ppm/F, or any subrange thereof.

Table one below shows the CTE for a variety of materials that may be used. The first three entries in the table are for metallic materials. The last four materials are non-metallic materials. Note that the CTE for the listed metallic materials is significantly less than that for the listed non-metallic materials. In various embodiments, the metallic materials are suitable for use in the left and right portions 103 and 104, while the non-metallic materials are suitable for use in the central portion 105.

TABLE ONE

| Material | CTE (inch per inch per degree Fahrenheit) |
|---|---|
| Aluminum | $13.1*10^{-6}$ |
| Steel | $6.7*10^{-6}$ |
| 300 Series Stainless steel | $9.6*10^{-6}$ |
| UHMW | $8.37*10^{-5}$ |
| HDPE | $1.25*10^{-4}$ |
| PVC | $0.73*10^{-4}$ |
| PE | $1.24*10^{-4}$ |

Figure 3:
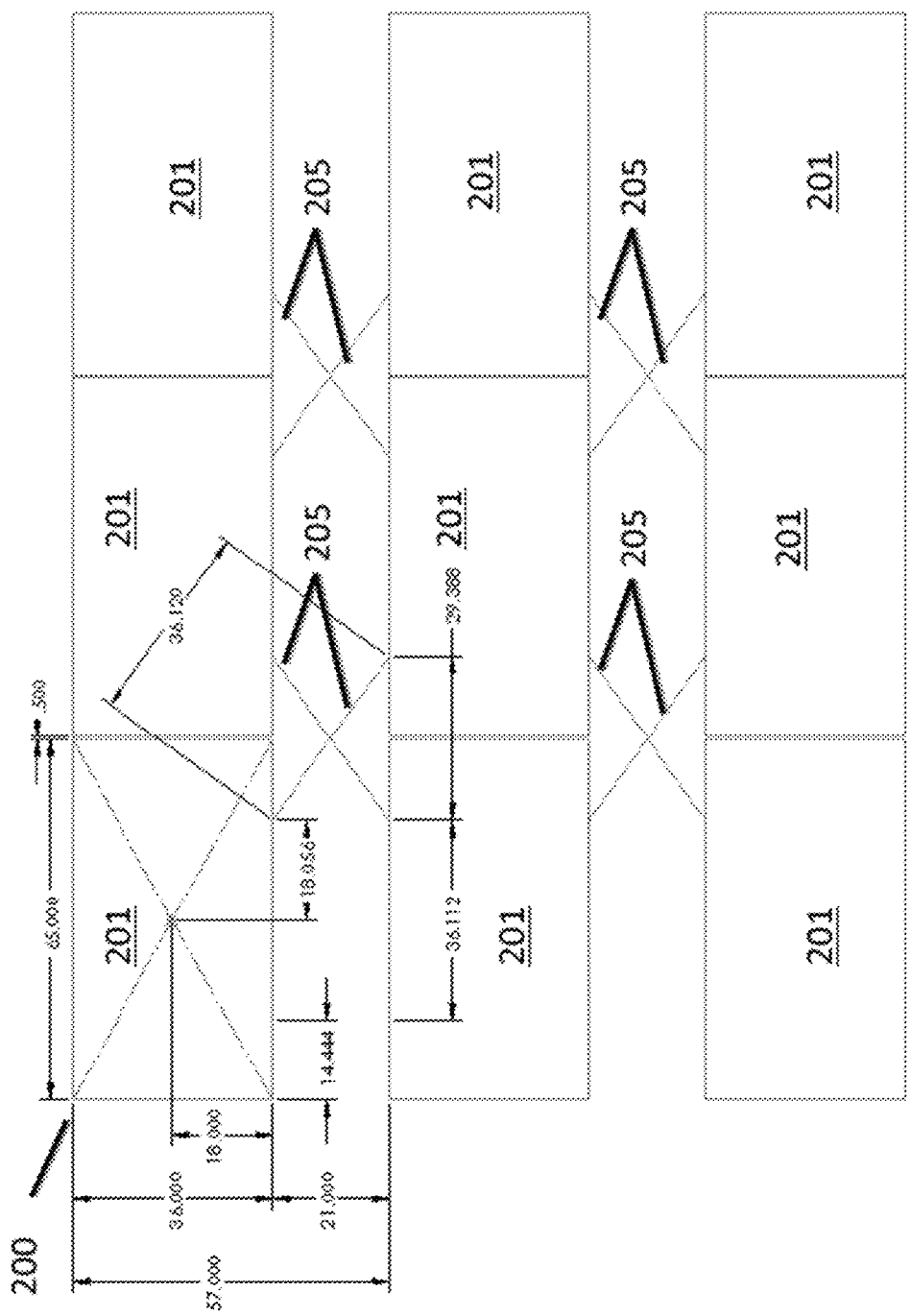
FIG. 3 is a schematic of a solar module mounting system featuring thermal growth compensators shown in a top down view. Exemplary dimensions in arbitrary units are shown.

The thermal growth compensator 100 described herein may be used in a variety of applications. FIG. 3 shows the use of the thermal growth compensator 100 as a crosslink in a solar module mounting system 200. As shown, nine rectangular solar modules 201 are arranged in a rectangular array of three rows of three, however it is to be understood that, in other embodiments, any suitable number and arrangement may be used. The modules 201 are thermally expand and contract about their centers.

In some embodiments, the solar module 201 is a packaged interconnected assembly of solar cells, e.g., photovoltaic cells. In some embodiments, the solar module may be used as a component in a larger photovoltaic system to offer electricity for commercial and residential applications.

Each module 201 is attached to other modules in the array using crosslinks 205. Each crosslink 205 includes a thermal growth compensator 100 of the type described herein. The crosslinks are rigidly connected, yet free to expand or contract in a direction necessary for thermal compensation. The modules 201 in the array are arranged with one edge ruling along the column (e.g., North-South) direction of the array and a perpendicular edge running along the row (e.g., East-West) direction. The crosslinks 205 are arranged at an angle transverse (e.g., at a 45 degree angle, or any other suitable angle) to the row and column directions of the array. The expansion/contraction properties of the crosslinks 205 may be chosen to oppose and balance those of the modules, thereby reducing or even eliminating thermal stress and strain over a desired temperature range (e.g., −50 C to 100 C or any subrange thereof).

In the embodiments shown, the crosslinks extend between Airy points of edges of the modules 201. As is known in the art, Airy points are the support points along a length of an object that minimize bending or droop. Airy points are arranged symmetrically around the center of the length and are separated by a distance equal to $1/\sqrt{3}$ times the total length (approximately equal to five ninths of the total length). However, in various embodiments other suitable choices of support or attachment points may be used.

The above described transverse crosslink arrangement is advantageous, as it allows each thermal growth compensator to compensate for thermal expansion of the modules along two directions, allowing for the total number of required thermal growth compensators 100 to be reduced or minimized. However, in other embodiments, different arrangements may be used. For example, FIG. 4 shows two solar modules 201 mounted using four thermal growth compensators 100. The modules 201 thermally expand and contract about their centers. Two of the four compensators 100 are arranged parallel to a first pair of module edges. The other two compensators 100 are arranged parallel to a second pair of module edges and perpendicular to the first pair of module edges. Accordingly, the compensators may compensate for module expansion and contraction along two orthogonal directions (e.g., north-south and east-west). However, compared to the transverse arrangement shown in FIG. 3, twice the number of thermal growth compensators 100 per module 201 are required.

As shown in FIG. 4, the compensators 100 are attached to the edges of the modules 201 at the Airy support points of the edges. However, in various embodiments other suitable choices of support points may be used.

FIGS. 5A and 5B show a solar module mounting system 500 for mounting and a rectangular array of solar modules 201. FIG. 5A is a top down view. FIG. 5B is a side view.

The mounting system 500 includes a plurality of support structures 501 and deflector elements 502. In the arrangement shown, the left edge of each module 201 is attached to and support by the right side of a pair of support structures 501.

The right edge of each module 201 is attached to and support by the left side of a pair of support structures 501. As shown, the left and right sides of each support module are positioned at different heights above the surface on which the support structures 501 rest, thereby inclining the modules at an angle. Any angle of inclination may be chosen, including a flat (zero angle of inclination) arrangement.

Deflector elements 502 are attached to the support structures to deflect wind up and over the modules, to reduce or eliminate lifting forces caused by the movement of air under the modules.

FIG. 6A shows a detailed perspective view of the support structure 501. FIG. 6B shows a side view of the support structure 501. In the example shown, the support structure 501 includes of four tubular support members 601, 602, 603 and 604. For the sake of clarity, the support members will be referred to as the northeast member 601, the northwest member 602, the southwest member 603 and the southeast member 604. However, in various embodiments the members may be arranged along any suitable direction. Each of the members 601, 602, 603, 604 may be made of a metal tube bent into a suitable shape, e.g., aluminum or rolled steel.

The support from includes four thermal growth compensators 100 of the type described herein. Each of the compensators attaches abutting ends of pairs of the support members 601, 602, 603, 604.

Two of the four devices 100 provide compensation along the North-South (N-S) direction. One connects the northeast member 601 to the northwest member 602. The other connects the southwest member 603 to the southeast member 604.

The other two devices 100 provide compensation along the East-West (E-W) direction. One connects the northeast member 601 to the southeast member 604. The other connects the northwest member 602 to the southwest member 603. The operation of the compensators is further detailed below.

The support structure 501 may include one or more pads 610 used to contact an underlying surface. The pads may be chosen from a material, e.g., rubber, which protects the underlying surface (e.g. a building roof) from damage. In some embodiments, the support structure 501 may include one or more components (e.g., a pan) suitable for receiving the weight of a ballast material (not shown). In various embodiments, a portion of the frame 501 may be attached to or embedded in a ballast material (not shown).

In various embodiments, the support structure may include clips 620 or other attachment facilities for attaching the wind deflectors 502.

In various embodiments, the support from may be attached to one or more of the modules 201 using an attachment claw of any of the types described in the publications incorporated by reference above. In other embodiments, any other suitable attachment may be used. In some embodiments a facility is included which provides an electrical connection between the module 201 and the frame 501 to assist in grounding. In some embodiments, this electrical connection is provided directly using an attachment claw. In other embodiments, a separate connection facility may be used. In some embodiments, the electrical connection provided between the frame 501 and the attached modules 201 meets or exceeds the grounding continuity requirements set out in grounding standards known in the art, e.g., in Underwriters Laboratory standard UL2703 (available at http://ulstandardsinfonet.ul.com).

In some embodiments, the attachment between the support structure 501 and the modules 201 may be made along the edges of the modules, e.g., such that the module is supported at one or more Airy points of the edges. Such embodiments advantageously reduce or minimize stress on the module due to bending or drooping of the module between the points of support.

In some embodiments, support structure 501 (or any component thereof) may also contain one or more wire chases (not shown) that can be used for running electrical wire through the support structure. Such wire chases may provide integrated wire management and integrated grounding capabilities.

FIG. 6C shows a top down view of the support structure 501 detailing the thermal growth compensators 100. As noted above, the support structure 501 includes four thermal growth compensators 100 of the type described herein. Two of the four devices 100 provide compensation along the North-South (N-S) direction, while the other two devices 100 provide compensation along the East-West (E-W) direction. Each of the compensators is attach to the abutting ends of pairs of the support members 601, 602, 603, 604. The thermal expansion and contraction of the thermal growth compensators 100 is tuned to match but oppose the thermal expansion and contraction of the attached solar modules 201. Accordingly, the frames 501 can accommodate the thermal motion of the modules, reducing or elimination thermal stress and strain (and therefore wear and tear on the modules 201 and mounting system 500). In some embodiments, this reduces or eliminates motion of the solar module array relative to the underlying supporting surface, advantageously reducing or preventing damage to the surface.

FIG. 5C shows a perspective view of a solar module mounting system 500 using a transverse crosslink arrangement similar to the type shown in FIG. 3 for the support structures 501. The solar modules 201 are mounted on support structures 501, as in FIGS. 5A and 5C. However, in this embodiment, each support structure 501 includes two crosslinks 205 that are transverse to each other, and to the row and column directions of the array of modules 201. Each crosslink 205 includes a thermal growth compensator 100. Note that, advantageously, athermalization is provided using only two compensators 100 per mounting frame 100, as compared to the four compensators per frame in the embodiments shown in FIGS. 5A-5B and 6A-C.

In various embodiments, the solar module mounting system 500 may include any of the features described in Appendix A to this application.

FIG. 7A shows an exploded view of one of the thermal growth compensators 100 of the support structure 501. FIG. 7B shows a side view of the device. As shown, the thermal growth compensator 100 connects abutting ends of the support members 603 and 604, but a similar arrangement applies to other pairs of support members.

FIGS. 7C, 7D, and 7E show cross sections of the thermal growth compensator 100 at a baseline temperature (e.g., as labeled, room temperature), a temperature warmer than baseline temperature (labeled "hot"), and a temperature colder than a baseline temperature (labeled "cold"), respectively. A compensator tube 705 is made of a material with a CTE greater than that of the frame support members 603 and 604. The left end 703 of the support member 603 on the left hand side of the figures fits around the compensator tube 705, and is attached to the right hand side of the tube 705, using a rivet or any suitable attachment. A connector tube 704 has a left end that is inserted into the compensator tube 705, and attached to the left hand of the tube 703, using a rivet attachment. The right end of the connector tube 704 is connected to the support structure member 604 on the right hand side of the figure, also with a rivet connection. In various embodiments, other connection types (e.g. adhesive connections, welded connections, etc.) may be used.

As will be apparent to one skilled in the art, this configuration of thermal growth compensator 100 is substantially equivalent to that shown in, e.g., FIG. 2A, wherein element 705 corresponds to element 105, element 703 corresponds to element 103, and element 704 corresponds to element 104.

Accordingly, when the thermal growth compensator 100 is heated from baseline, it operates to move the abutting ends of the left and right support from members 603, 604 closer together (FIG. 7D). When the thermal growth compensator 100 is cooled from baseline, it operates to move abutting ends of the support members 603 and 604 farther apart (FIG. 7E). This thermal behavior operates in the opposite sense from that of the solar modules (which expand when heated and contract when cooled), thereby providing thermal compensation to athermalized the system.

In some embodiments, the thermal growth compensator includes a grounding link 720 that establishes a continuous electrical connection between the abutting support structure members 603, 604. The link 720 may extend through the compensator tube 705 and connector tube 704 to establish the electrical continuity. In some embodiments, the electrical connection provided by the link 720 meets or exceeds the grounding continuity requirements set out in grounding standards known in the art, e.g., in Underwriters Laboratory standard UL 2703 (available at http://ulstandardsinfonet.ul.com). In some embodiments, the link 720 is deformable (e.g., stretchable or bendable), to accommodate the relative motion of the support structure members that it connects. Note that, although not visible in the cross section shown, the link 720 physically connects to the members 603, 604 to provide electrical connection.

By suitable choice of the materials and geometric arrangement of the thermal growth compensators 100 in the solar module mounting system 500, the system may be partially or completely athermalized. That is, the mounting system 100 may compensate for thermal expansion and contraction of the modules 201, such that the array remains in place without rotation or translation relative to its underlying surface (e.g., a roof top), while reducing or eliminating thermal stress on the modules 201. In this fashion, the thermal growth compensators 100 may be "tuned" for a particular application based on the properties of the modules (e.g., size, shape, CTE, etc.) and the module array configuration (e.g., row and column spacing, module incline angle, etc.).

Figure 8B:
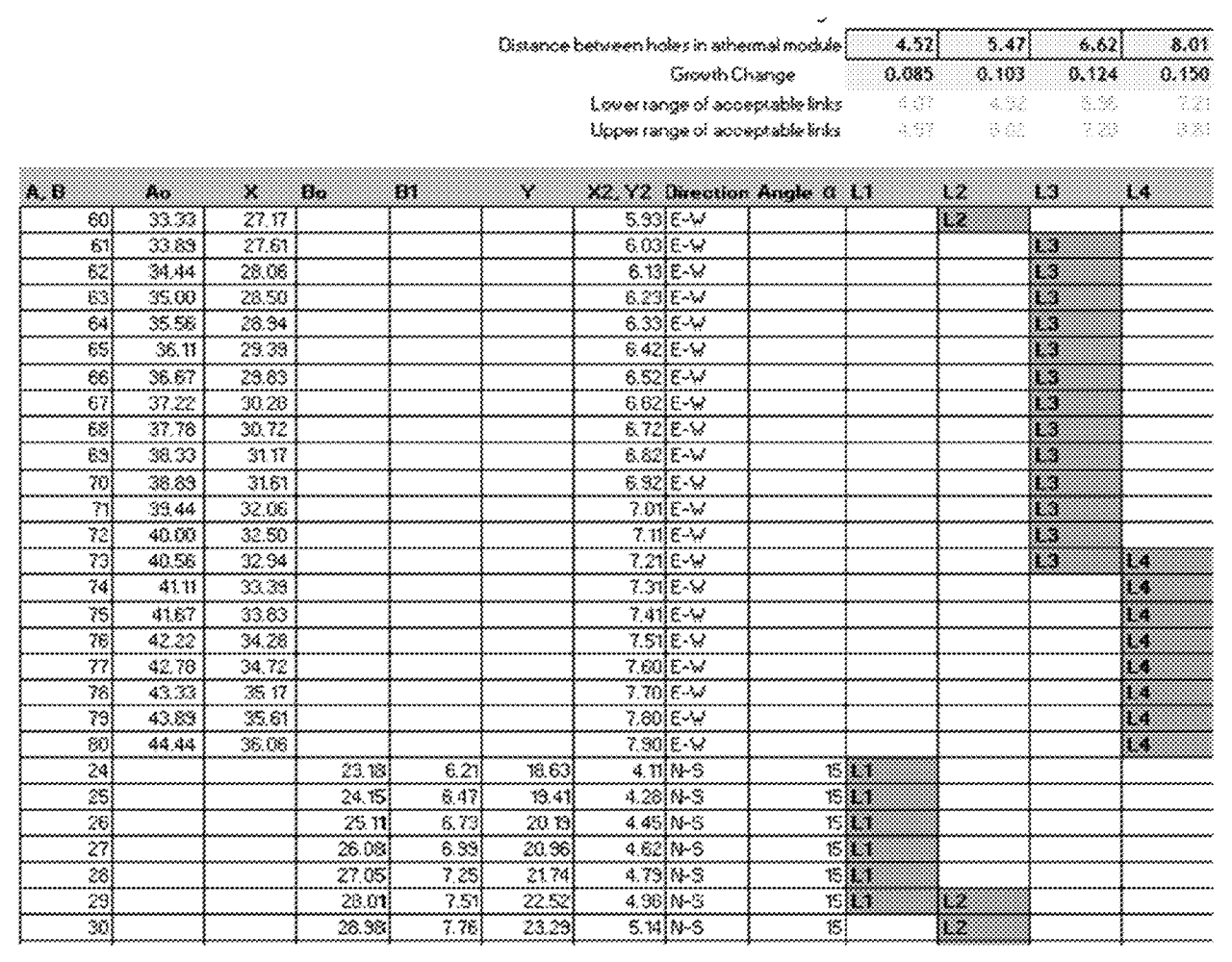

FIGS. 8A-8C illustrate a method of choosing suitable designs for the thermal growth compensators 100 in an exemplary embodiment of the mounting system 500 described above. FIG. 8A shows a table of input parameters characterizing aspects of the system 500 and the associated array of modules 201. FIG. 8B is a look up table which provides suitable design parameters for the thermal growth compensators 100 for various module sizes. FIG. 8C is a schematic illustrating the correspondence of input and output parameter labels from FIGS. 8A and 8B to aspects of the mounting system 500 and corresponding array of modules 201. For convenience, the direction from left to right in FIG. 8C (top pane) will be referred to as the E-W direction and the perpendicular direction in the page will be the N-S direction, however, in various embodiments, any suitable orientation may be used.

Referring to FIG. 8A, in a first step, a number of input parameters are collected. The parameters are as follows. CTE1 is the CTE of the support members 601, 602, 603, 604 of the support structure 501. CTE2 is the CTE of the compensator tube 705. CTEp is the CTE of the frame of the solar modules 201. $A_1$ is the gap between the modules along rows of the array (i.e., left to right in FIG. 8C, upper module). AP is related to the location of the Airy points of the modules 201 (i.e., about ⅖ of the total length of the module edge from the ends of the module edges). The SR is the shading ratio, corresponding to the ratio of the column spacing of the array of module 201 (labeled Y in FIG. 8C) to the height of the raised edge of the inclined module 201 (labeled B1 in FIG. 8C). TL and TH are the low and high temperatures in the operating temperature range of the mounting system 500. The temperature differential dT is equal to TH-TL. SL is the strain limit, corresponding to the maximum allowed strain on the modules 201 over the operating temperature range of the mounting system 500 (discussed in greater detail below).

Referring to FIG. 8B, using the input parameters, a look up table may be generated giving compensator designs for a variety of module sizes. FIG. 8C illustrates the meaning of the parameters found in the lookout table. The parameters A and B are the lengths of the modules 201 along the E-W and N-S directions, respectively. $A_0$ is the distance between Airy points along the E-W module edge. The angle of inclination of the modules 201 is α, where sin α is equal to B/B1. $B_0$ is equal to B sin α (i.e. the length of the horizontal projection of the inclined module, as shown in FIG. 8C, lower module). X is the distance between the Airy points of adjacent modules 201 in a row of the array.

X2 gives the arrangement of the E-W aligned thermal growth compensators 100. As illustrated in FIG. 8C, middle module, X2 is the distance between the points of attachment of the support structure to the compensator tube element (compare with FIGS. 1A-1C). That is, in the embodiment shown in FIGS. 7A-7C, X2 corresponds to the distance between the point where the element 703 is attached to the compensator tube 705 and the point where the element 704 is attached to the compensator tube 705. For a given module size, X2 may be calculated as:

$$X2 = \frac{A_0 \times CTE_p + X \times CTE_1}{CTE_2 - CTE_1}.$$

Y2 is the corresponding length for the N-S aligned thermal growth compensators 100. For a given module size, Y2 may be calculated as:

$$Y2 = \frac{B_0 \times CTE_p + Y \times CTE_1}{CTE_2 - CTE_1}.$$

The values of X2 and Y2 give the attachment (e.g., rivet hole) spacings for the thermal growth compensators 100 along both N-S and E-W directions that correspond to a 0% thermal strain over the operating temperature range for the system. Note however, that there are many available unique models all having varying length and width dimensions. Thus each would require a specific compensator for each direction. To reduce the number of varying length compensators, the modules are grouped into ranges that allow for strain less than the strain limit SL (as shown 10%) for the entire solar module array and mounting system. This reduces the number of thermal compensators to, e.g., four to cover all scenarios in the given range.

As will be understood by those skilled in the art, the above described techniques may be readily adapted to provide designs for other mounting systems, e.g., the system shown in FIG. 3 above.

As will be understood by one skilled in the art, the concepts described above may be used to produce thermal growth compensators of various configurations. FIGS. 9A, 9B, and 9C show an alternate embodiment of a thermal growth compensator 100. In this embodiment, the compensator includes first, second, and third elongated members 901, 902, 903 having a relatively low CTE. The compensator 100 also includes first and second elongated members 904, 905 having a relatively high CTE. The members are arranged in a staggered configuration that essentially repeats the configuration shown in FIGS. 1A-1C. The right ends of the first and third low CTE members 901, 903 are attached to the left ends of the first and second high CT members 904, 905, respectively. The left end of the second low CTE member 902 is attached to the left end of the first high CTE member 904. The right end of the second low CTE 902 member is attached to the right end of the second low CTE member 905.

FIG. 9A shows the compensator 100 at a baseline temperature. As shown in FIG. 9B, as the temperature increases from the baseline temperature, the first and second high CTE members 904, 905 expand more than the first, second, and third low CTE members 901, 902, and 903. The left end of the first low CTE member 901 is fixed, and so the right ends of the second and third low CTE members 902 and 903 are drawn towards the left end of the first low CTE member 901. Accordingly, the overall length of the thermal growth compensator 100 decreases as the temperature is increased from the baseline temperature.

As shown in FIG. 9C, as the temperature decreases from the baseline temperature, the first and second high CTE members 904, 905 contract more than the first second and third low CTE members 901, 902, and 903. The left end of the first low CTE member 901 is fixed, and so the right ends of the second and third low CTE members 902 and 903 move away from the left end of the first low CTE member 901. Accordingly, the overall length of the thermal growth compensator 100 increases as the temperature is decreased from the baseline temperature.

As described above, the thermal growth compensator 100 may be used to provide thermal compensation. As will be understood by those skilled in the art, the basic structure may be repeated to include any suitable number of low and high CTE members in a staggered arrangement. Notably, this repetition essentially multiplies the compensation effect of the basic unit of the arrangement. This may be useful in embodiments where the difference in CTE between the high CTE and low CTE members is not very large (e.g., where the members are made of two different metallic materials). By use of a suitable number of members, equivalent compensation can be provided to that found in a device with fewer members, but larger CTE difference.

Figure 10B:
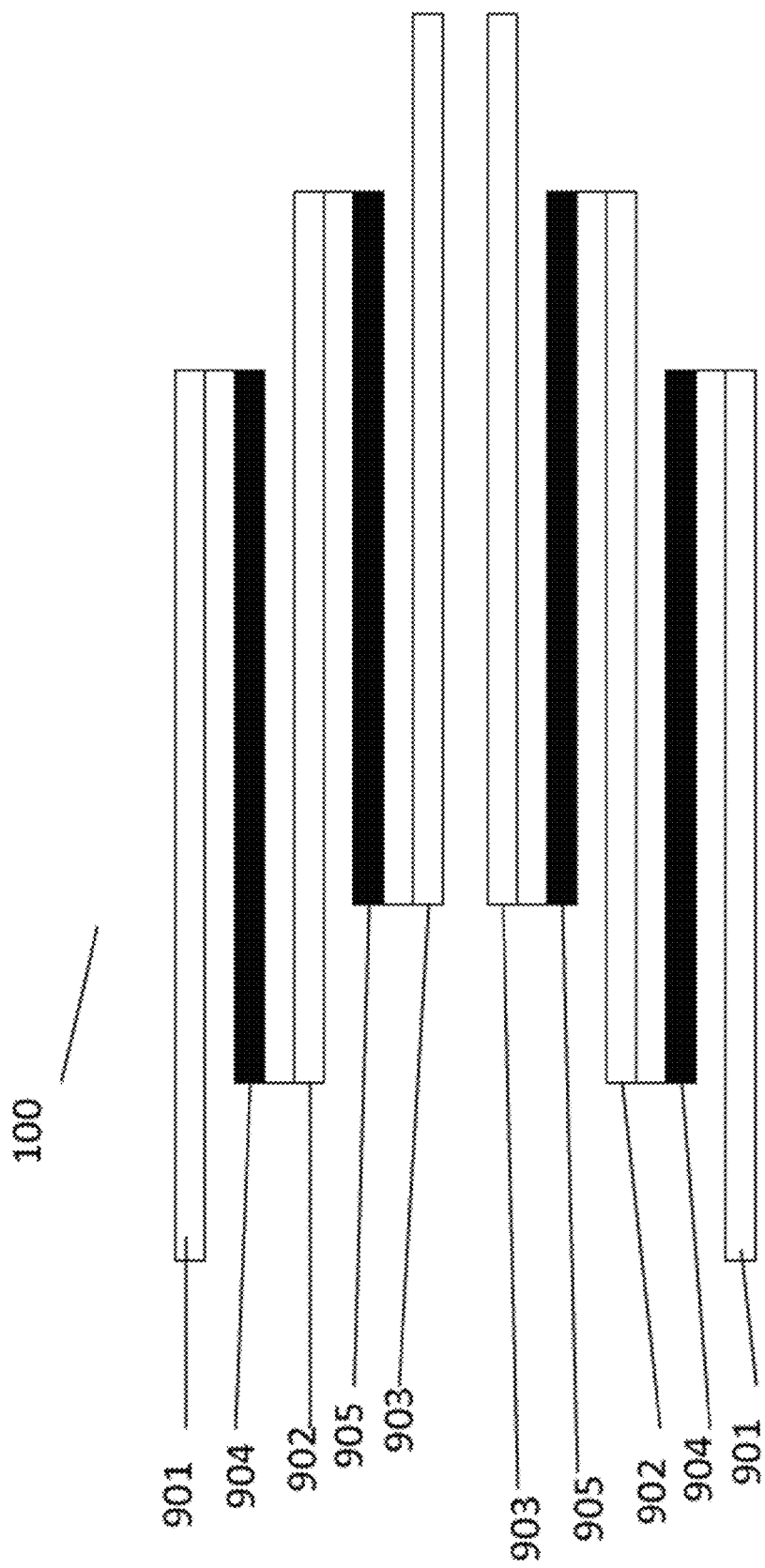
FIG. 10B is a cross sectional view of the thermal growth compensator of FIG. 10A.

In various embodiments, the members 901-905 of the thermal compensator may be of any suitable shape, e.g., rods, plates, disks, tubes, etc. For example FIGS. 10A and 10B show an embodiment of a thermal compensator 100 where the members 901-905 are concentrically disposed elongated tubular members. FIG. 10A shows a head-on view of the compensator 100. FIG. 10B shows a cross section taken along AA, as shown in FIG. 10A. A first low CTE member 901 is disposed about a second low CTE member 902. The second low CTE member 903 is disposed about a third low CTE member 903. A first high CTE member 904 is disposed in the annular space between the first and second low CTE members 901 and 902. A second high CTE member 904 is disposed in the annular space between the second and third low CTE members 902 and 903.

Again, the members 901-905 are arranged in a staggered configuration that essentially repeats the configuration shown in FIGS. 1A-1C. The right ends of the first and third low CTE members 901, 903 are attached to the left ends of the first and second high CT members 904, 905, respectively. The left end of the second low CTE member 902 is attached to the left end of the first high CTE member 904. The right end of the second low CTE 902 member is attached to the right end of the second low CTE member 905.

As the temperature increases from a baseline temperature, the first and second high CTE members 904, 905 expand more than the first, second, and third low CTE members 901, 902, and 903. The left end of the first low CTE member 901 is fixed, and so the right ends of the second and third low CTE members 902 and 903 are drawn towards the left end of the first low CTE member 901. Accordingly, the overall length of the thermal growth compensator 100 decreases as the temperature is increased from the baseline temperature.

As the temperature decreases from the baseline temperature, the first and second high CTE members 904, 905 contract more than the first second and third low CTE members 901, 902, and 903. The left end of the first low CTE member 901 is fixed, and so the right ends of the second and third low CTE members 902 and 903 move away from the left end of the first low CTE member 901. Accordingly, the overall length of the thermal growth compensator 100 increases as the temperature is decreased from the baseline temperature.

Figure 11A:
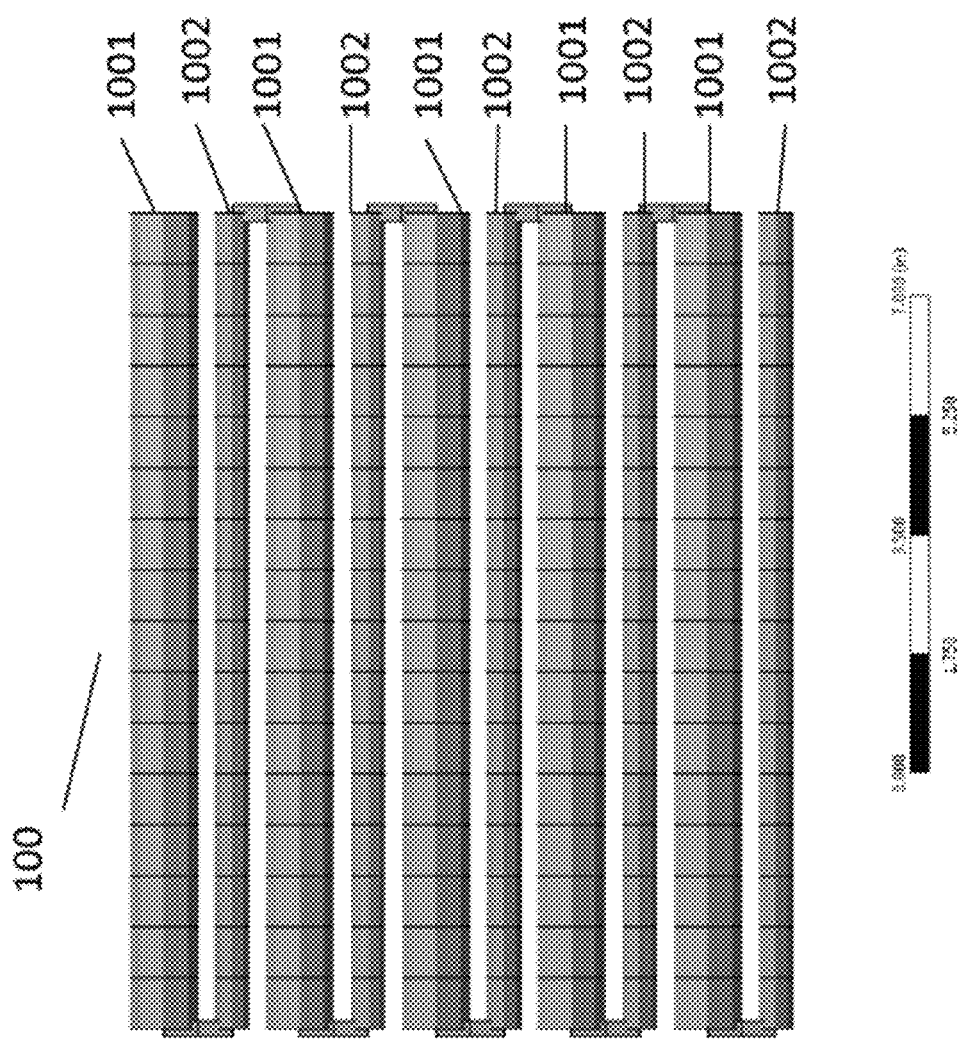
FIG. 11A is an illustration of a metallic composite thermal growth compensator.

FIG. 11A shows an illustration of an all-metal composite thermal growth compensator 100. The compensator 100 is made of five elongated members 1001 made of a first metal (e.g., stainless steel such as 416 stainless steel) having a relatively low CTE, and five elongated members 1002 made of a second metal (e.g., zinc) having a relatively high CTE. In various embodiments, any other suitable metallic materials may be used.

As in the examples provided above, the members 1001 and 1002 are arranged in an alternating fashion, with opposite ends of each pair of adjacent high and low CTE members attached to one another. As in the examples provided above, this arrangement may be used to provide thermal compensation. The members may be attached using any suitable technique, including welding, brazing, soldering, forming, gluing or adhering (e.g., using an epoxy adhesive), mechanical fastening, etc. As shown, the ten members 1001, 1002 are each twelve inches long, but any suitable, size, shape, and number of elements may be used.

Figure 11B:
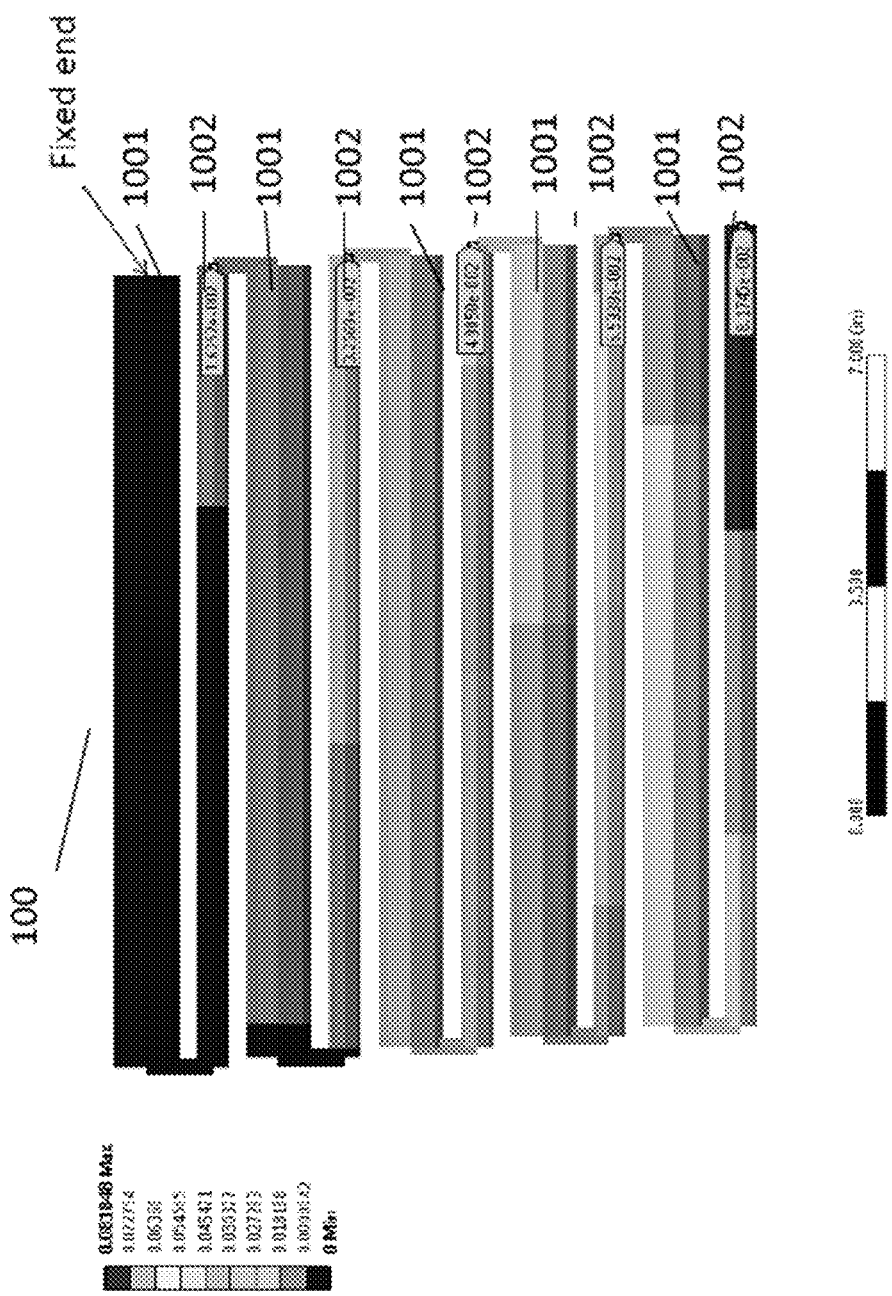
FIG. 11B is a thermal growth plow of the metallic composite thermal growth compensator of FIG. 11A.

FIG. 11B is a plot of the thermal growth of the thermal growth compensator 100 from FIG. 11A. growth is shown in arbitrary units for a temperature increase of 110° F. over a baseline temperature. The increased temperature causes the high CTE members 1001 to expand more than the low CTE members 1002. This causes the left end of the low CTE member 1001 located at the bottom of the figure to move towards the fixed right end of the low CTE member 1002 located at the bottom of the figure. The opposite would occur for a temperature decrease. Accordingly, the compensator 100 operates similarly to the compensators detailed above.

As is known in the art, metallic materials tend to have a CTE that is constant over a broad range of temperatures. Accordingly, all-metal metal embodiments of the thermal growth compensator may advantageously provide consistent compensation over a broad temperature range. This may be particularly advantageous when using the compensator 100 to athermalize a system including other metallic elements. As with the compensators described above, the all metal compensator may be tuned to have a overall CTE that is positive, negative, or zero, using a suitable choice of materials and geometry.

Further, in some applications the use of an all-metal compensator may obviate the need for a separate ground link element. All-metal compensators may also have improved rigidity in comparison to compensators featuring non-metallic (e.g., plastic) elements. In some applications all-metal compensators may bear and/or transmit a higher load than compensators featuring non-metallic (e.g., plastic) elements.

As is known in the art, metallic materials tend to have a modulus of elasticity that is relatively constant over a large temperature range, providing an additional potential advantage in comparison to compensators featuring non-metallic (e.g., plastic) elements.

Figure 12A:
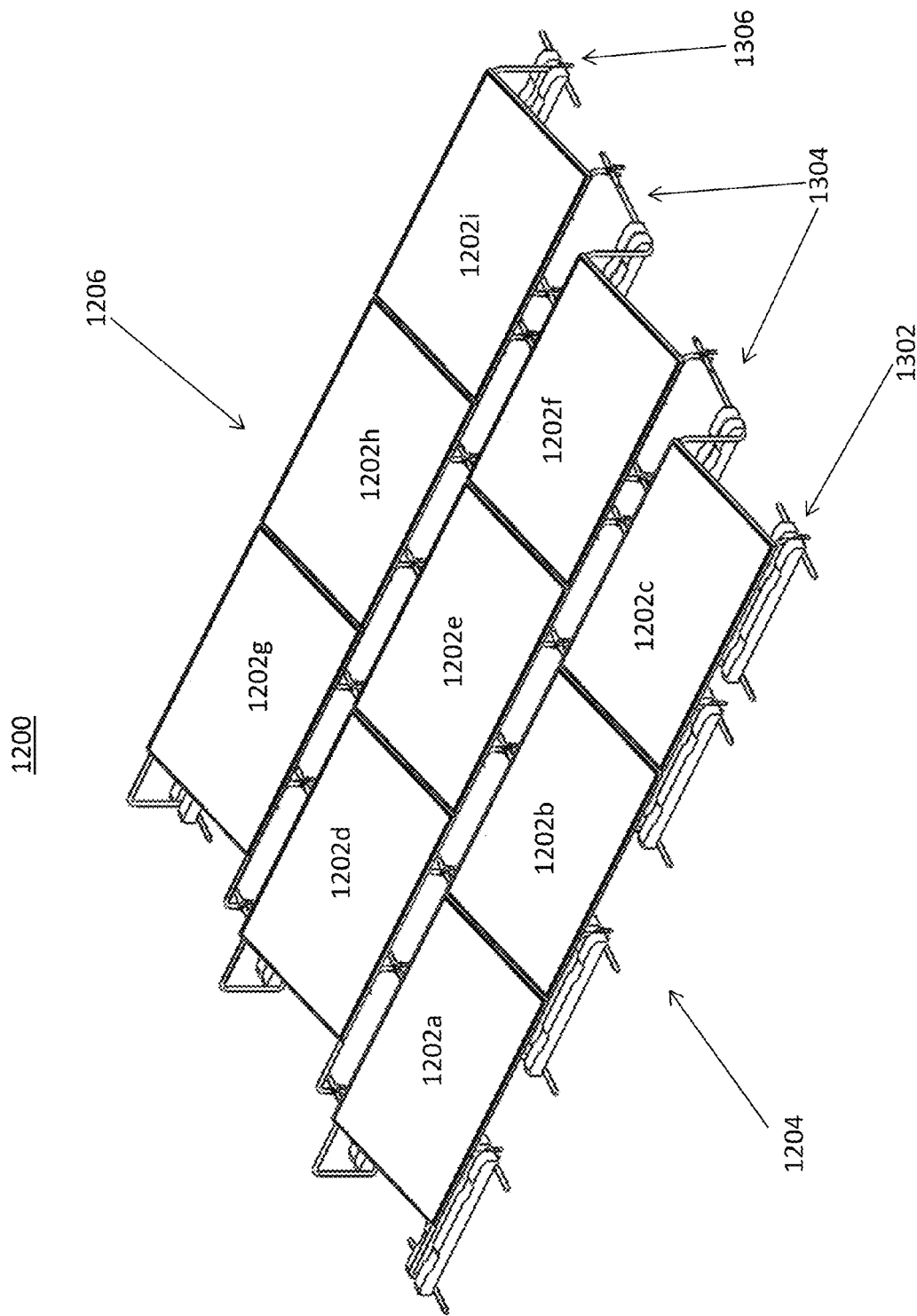
FIG. 12A is a front perspective view of a module mount assembly supporting several solar panel modules.
Figure 12B:
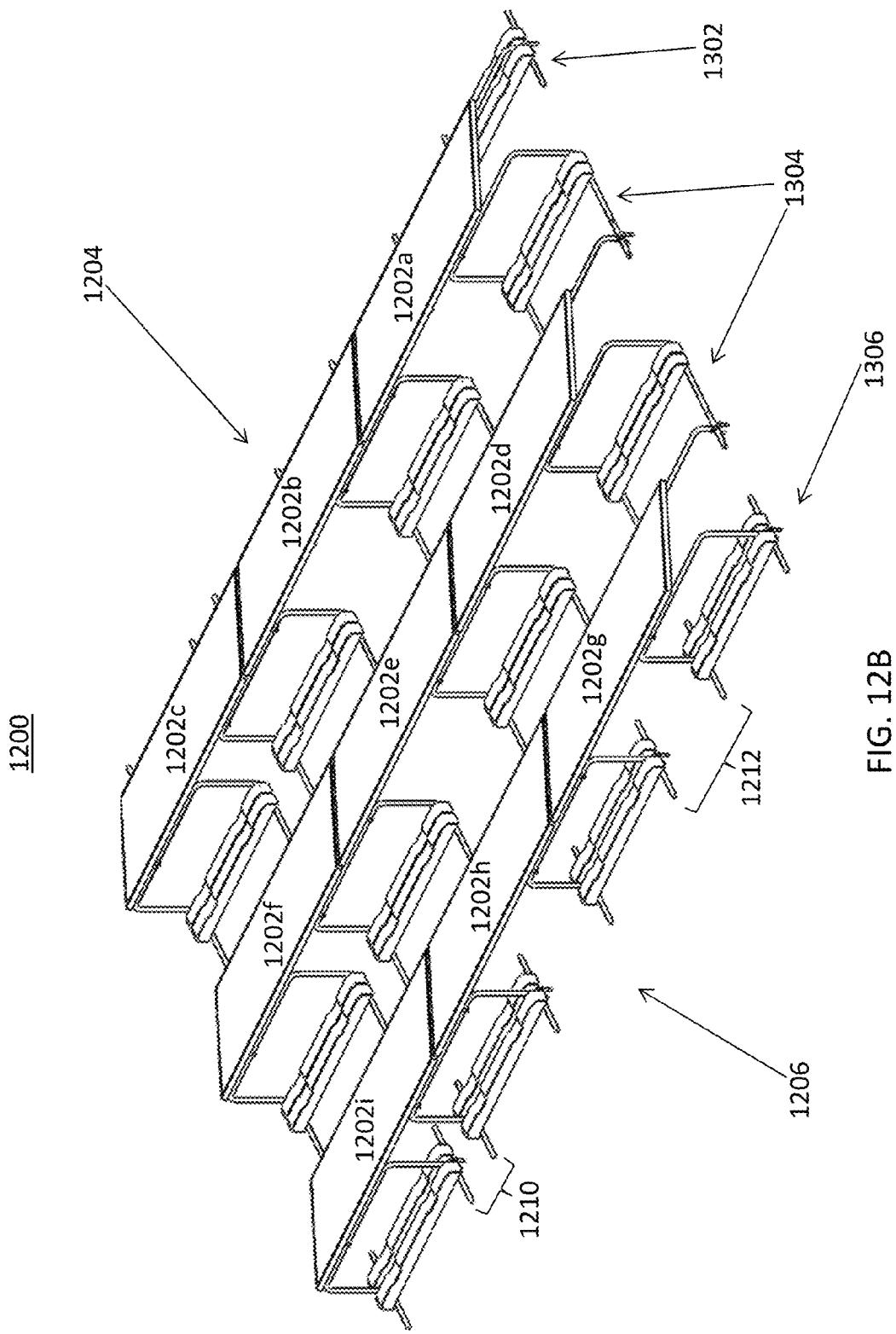
FIG. 12B is a rear perspective view of the module mount assembly of FIG. 12A.

B. Systems and Methods for Installing an Array of Solar Panel Modules Above a Supporting Surface FIG. 12A is a front perspective view of a module mount assembly 1200 supporting solar panel modules 1202a-1202i (generally referred to as 1202). FIG. 12B is a rear perspective view of the module mount assembly 1200 of FIG. 12A. The module mount assembly 1200 may be deployed on a mounting surface such as, for example, on a flat roof area. Aspects of the present implementations may be applied to other mounting surfaces as well, such as a field or other open ground area.

The module mount assembly 1200 includes a first side, which may be referred to as the front side 1204 and a second side, which may be referred to as the rear side 1206. The solar panel modules 1202 are shown in FIG. 12A facing away from the rear side 1206 of module mount assembly 1200. In some implementations, the rear side 1206 may correspond to a geographical North position of the module mount assembly 1200. For example, the rear side 1206 may be positioned approximately to the North so that the tilted faces of the solar panel modules 1202 are directed generally toward the South, e.g., tilted to more squarely face the direction of the sun for an installation north of the equator. However, the terms "front" and "rear" are used in this description for illustrative purposes only. For example, the front side 1204 is not limited to a geographic South position or to a direction that substantially faces the sun during peak daylight hours, and the rear side 1206 is not limited to a geographic North position or to a direction that generally faces away from the sun during peak daylight hours. In various implementations, any other suitable orientation may be used for the module mount assembly 1200.

The module mount assembly 1200 is formed from a plurality of front support structures 1302, interior support structures 1304, and rear support structures 1306. In the example shown in FIG. 1A, the module mount assembly 1200 supports nine solar panel modules 1202 arranged in a rectangular grid, but in various embodiments, any number and arrangement of modules may be used. For example, additional rows of interior support structures 1304 could be added to the module mount assembly 1200 in order to increase the number of solar panel modules 1202 that may be supported. The capacity for supporting solar panel modules 1202 can also be increased by increasing the number of support structures 1302, 1304, and 1306 in each row. In some embodiments, each solar panel module 1202 is a packaged interconnected assembly of solar cells, e.g., photovoltaic cells. In some embodiments, each solar panel module 1202 may be used as a component in a larger photovoltaic system to offer electricity for commercial and residential applications.

Each front support structure 1302, interior support structure 1304, and rear support structure 1306 can be mounted separately from all other support structures in the module mount assembly 1200. Although a single solar panel modules 1202 may be connected to more than one front support structure 1302, interior support structure 1304, or rear support structure 1306, the support structures themselves need not be connected to each other. Each support structure can be free standing and can be installed on a supporting surface, such as a roof, independently of any other support structures to be used in the module mount assembly 1200. Installation of an individual support structure is described further below in connection with the process 1600 shown in FIG. 16.

Figure 12C:
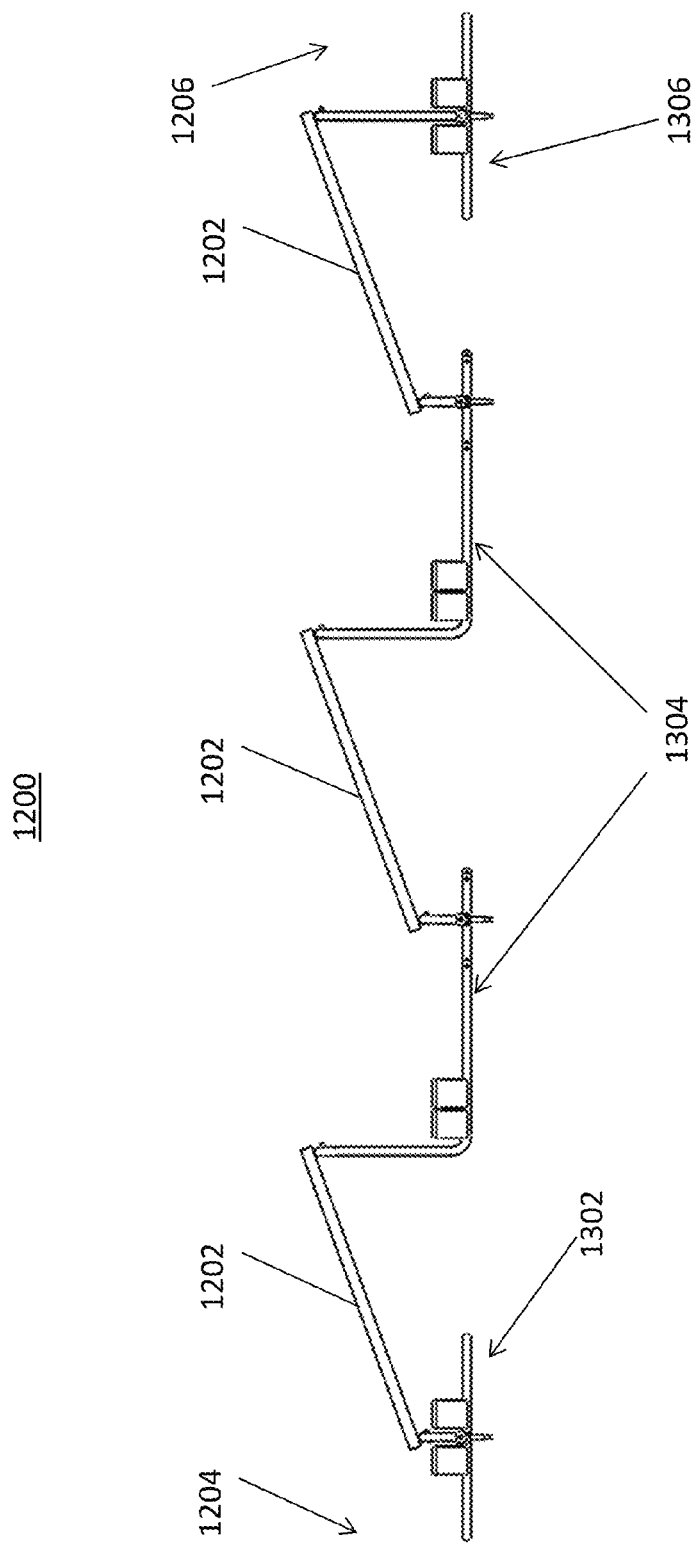
FIG. 12C is a side view of the module mount assembly of FIG. 12A.

The solar panel modules 1202 are illustrated in FIG. 12A as being mounted at an angle from the horizontal, but in some embodiments, the solar panel modules may be mounted at angles other than that illustrated in FIG. 12A or even horizontally. For example, the height difference between the front and rear portions of the support structures 1302, 1304, and 1306 can be selected to achieve any desired angle for the solar panel modules 1202. FIG. 12C is a side view of the module mount assembly of FIG. 12A. The angle of the solar panel modules 1202 with respect to the horizontal mounting surface is illustrated more clearly in FIG. 12C. In some implementations, the angle at which the solar panel modules 1202 are supported can be 5 degrees, 10 degrees, 15 degrees, 20 degrees, 25 degrees, 30 degrees, 35 degrees or any other angle. In some implementations the solar panel modules may be mounted may at any angle between 0 to 5 degrees, 4 to 10 degrees, 10 to 15 degrees, 15 to 20 degrees, 20 to 25 degrees, 25 to 30 degrees, and 30 to 35 degrees and so on. In some implementations, the solar panel modules may be mounted at an angle of zero degrees. The solar panel modules 1202 may in some embodiments be mounted at different angles throughout the module mount assembly 1200 and uniformly in others such as the one shown in FIG. 12A.

In some implementations, the module mount assembly 1200 can be configured such that the spacing of the support structures 1302, 1304, and 1306 within a given row may be varied. An example of such varied support structure spacing is illustrated in the rear perspective view of the module mount assembly 1200 shown in FIG. 12B. As shown, some of the rear support structures 1306 are separated by a relatively small distance 1210, while other rear support structures 1306 in the same row are separated by a relatively larger distance 1212. Despite this varied spacing of the rear support structures 1306, the solar panel modules 1202 can be arranged edge to edge throughout each row. In some implementations, the ability to vary the inter-row spacing of the support structures 1302, 1304, and 1306 allows for easier installation of the module mount assembly 1200, because the support structures 1302, 1304, and 1306 can more easily be positioned to avoid obstructions on the mounting surface, such as chimneys or exhaust vents on roofs, or rocks on the ground.

Figure 12D:
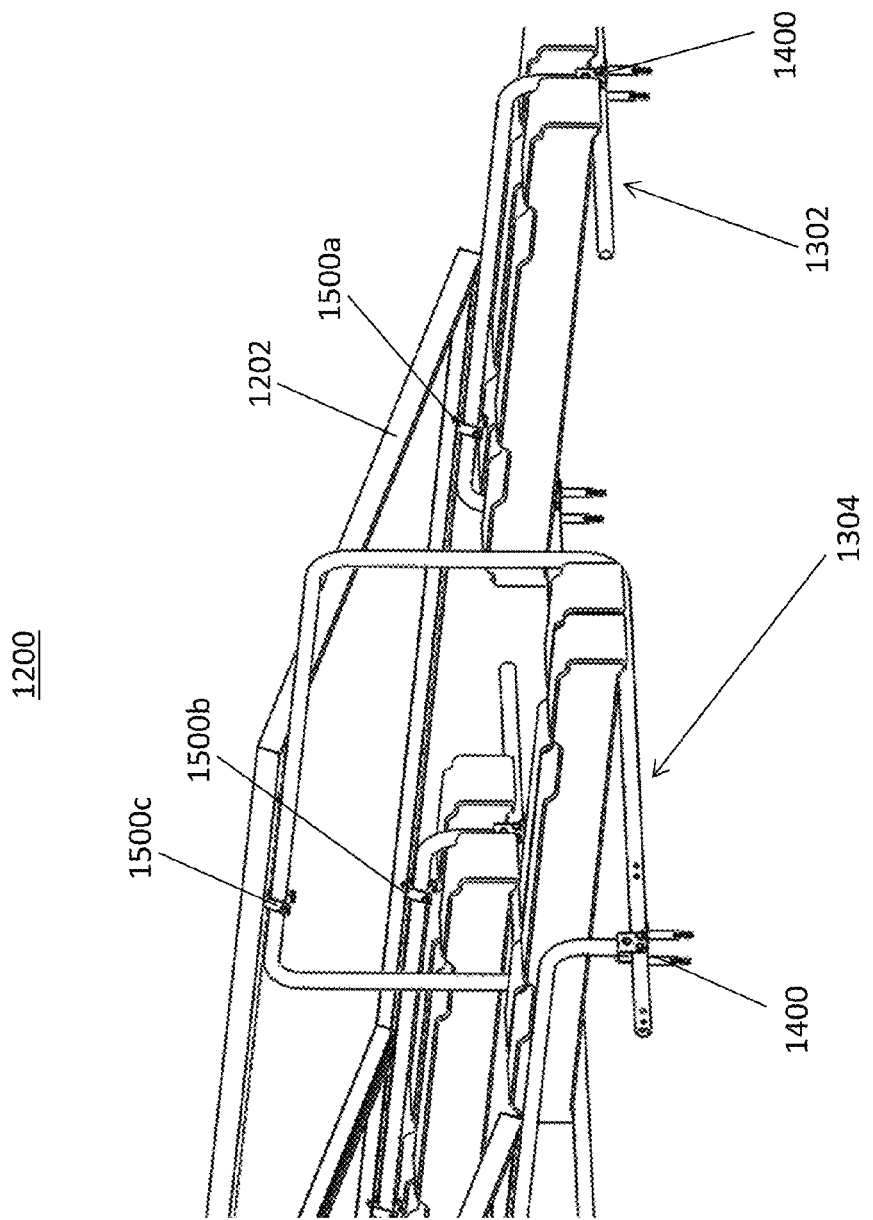
FIG. 12D is a second rear perspective view of the module mount assembly of FIG. 12A.

FIG. 12D is a second rear perspective view of the module mount assembly of FIG. 12A. The structural components of the module mount assembly 1200 can be seen more clearly from this perspective. For example, anchors 1400 are used to secure the module mount assembly 1200 to the mounting surface, such as a roof structure or ground. The module mount assembly 1200 also includes claw assemblies 1500a-1500c (generally referred to as claw assemblies 1500), which hold the solar panel modules 1202 in place on the module mount assembly 1200. In some implementations, the claw assemblies 1500 can be positioned on the module mount assembly 1200 such that they support each solar panel module 1202 at its Airy points. As is known in the art, Airy points are the support points along a length of an object that minimize bending or droop. Airy points are arranged symmetrically around the center of the length and are separated by a distance equal to $1/\sqrt{3}$ times the total length (approximately equal to five ninths of the total length). For example, the claw assemblies 1500a and 1500b are positioned at the Airy points of the front edge of the solar panel module 1202. The claw assembly 1500c is positioned at a first Airy point of the rear edge of the solar panel module 1202. Another claw assembly (not shown) could be positioned at the second Airy point of the solar panel module 1202. However, in various implementations, other suitable choices of support or attachment points may be used for the claw assemblies 1500. These and other structural components of the module mount assembly 1200 are described further below.

Figure 13A:
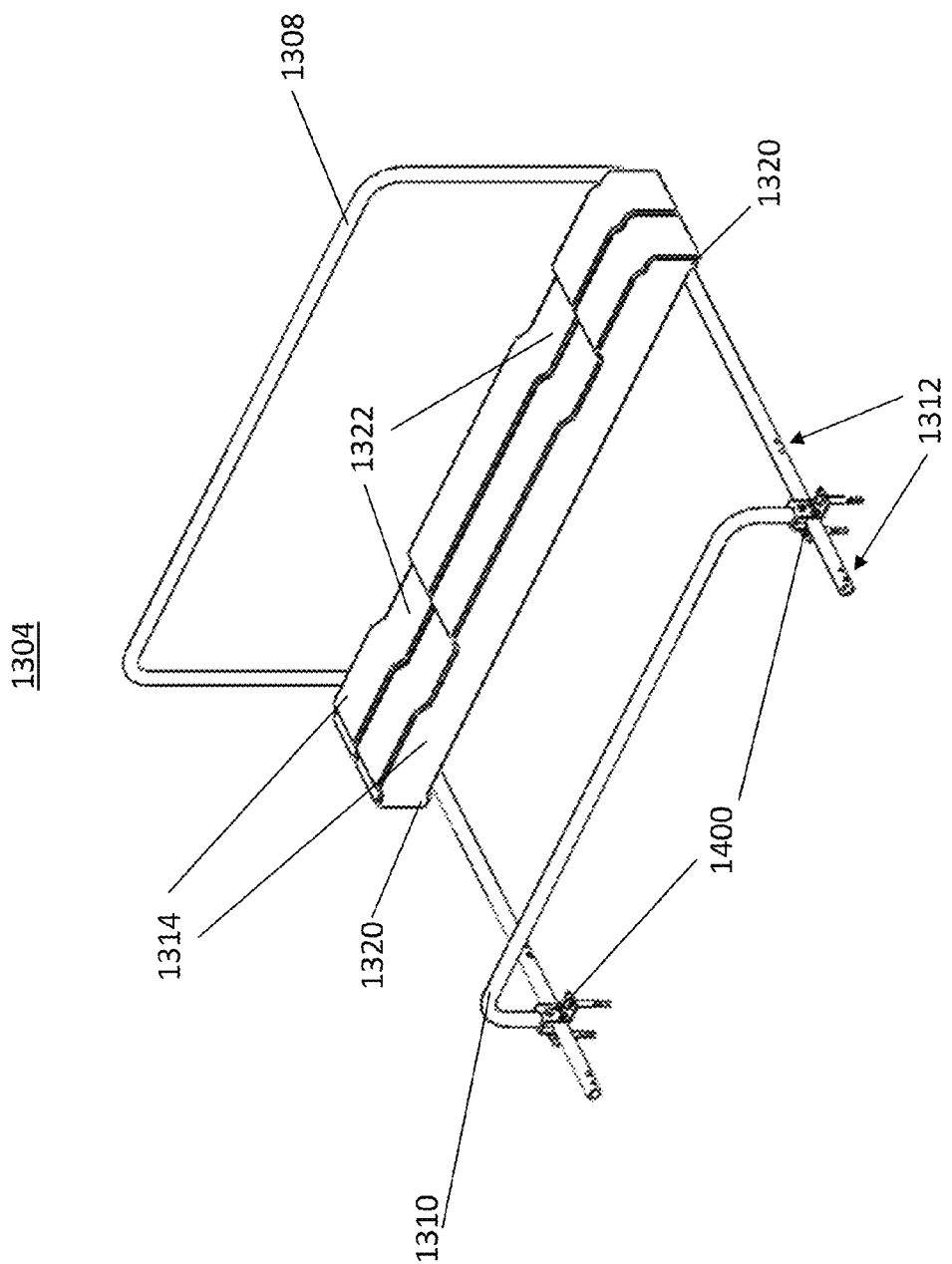
FIG. 13A is a perspective view of a first support structure for use in the module mount assembly of FIG. 12A.

FIG. 13A is a perspective view of a support structure 1304 for use in the module mount assembly 1200 of FIG. 12A. The support structure 1304 corresponds to the interior support structure 1304 shown in FIGS. 1A-1D. In some implementations, the interior support structure 1304 is formed from a plurality of connectable structural members. For example, the interior support structure 1304 includes two structural members 1308 and 1310. In some implementations, the structural members 1308 and 1310 are hollow and have circular cross-sections to increase structural efficiency. In other implementations, the structural members 1308 and 1310 may be solid or partially solid, and may have different cross sectional shapes. For example, the structural members 1308 and 1310 may have square, hexagonal, or I-beam cross sections. Although the structural members 1308 and 1310 are each shown as a single tubular structure, in some implementations, they may be formed from a plurality of structural members. For example, a lateral support member may be placed between two vertical post members to form each of the structural members 1308 and 1310.

In some implementations, the structural members 1308 and 1310 are formed from metal. For example, steel or aluminum may be used to form the structural members 1308 and 1310. In other implementations, a metal alloy may be used. Metal may be a suitable material due to its ability to provide structural integrity to the module mount frame. In addition, metal conducts electricity well, which can allow for an electrical path to earth ground through the support structures 1308 and 1310. In other implementations, the structural supports 1308 and 1310 can be formed from any material with sufficient structural rigidity to support the array of solar modules, regardless of electrical conductivity. For example, the structural supports may be formed from plastic or rubber.

A portion of the structural member 1308 extends along the mounting surface for stability. Solar panel modules, such as the solar panel modules 1202 of FIG. 12A, can be supported by the lateral portions of the structural members 1308 and 1310. The angle of the solar panel modules 1202 can be determined according to the difference in height of the structural member 1308 and the structural member 1310. For example, a larger height difference results in a greater angle with respect to the mounting surface. In some implementations, the structural members 1308 can interlock with corresponding structural members 1308 of a second interior support structure 1304. For example, the diameter of the rear horizontal portion of the structural member 1308 can be made narrower than the front horizontal portion, so that that the rear portion of a first interior support structure 1304 can be inserted into the front portion of a second interior support structure 1304.

Ballast blocks 1314 are positioned on the mounting surface over the lower portion of the structural member 1308. In some implementations, the ballast blocks 1314 are formed from pressed concrete, which can provide relatively high strength and can help to resist structural deformation due to changes in temperature. In other implementations, the ballast blocks 1314 can be made from another material, such as a metal. The material chosen for the ballast blocks 1314 can have a relatively high density to provide substantial weight in a relatively small volume. In some implementations, each ballast block 1314 can weigh in the range of about 20-30 pounds, 30-40 pounds, or 40-50 pounds. In other implementations, other suitable weights may be used for the ballast blocks 1314.

The ballast blocks 1314 may extend across the width of the support structure 1304. An elongated shape can be used for the ballast blocks 1314 to achieve the desired length while remaining sufficiently compact to facilitate installation. For example, the elongated shape allows a worker to hold a ballast block 1314 such that the center of mass of the ballast block 1314 is close to the body of the worker. This reduces strain on the worker and eases installation. As shown in FIG. 13A, the elongated shape also allows multiple ballast blocks 1314 to be positioned over the structural member 1308. For example, if the installation site is in an area that typically experiences seismic activity or high wind speeds, several ballast blocks 1314 may be positioned over each structural member 1308 in the module mount assembly for additional support. Structural members 1308 used in module mount assemblies at other installation sites that do not experience seismic activity or high winds can be secured with fewer ballast blocks 1314.

The outside edges of the ballast blocks 1314 include protrusions 1320 that extend lower than the middle portion, allowing the ballast blocks 1314 to secure the structural member 1308 in place. In some implementations, the protrusions 1320 extend sufficiently low to contact the mounting surface while interlocking with the interior support structure 1304. The portions of each ballast block 1314 located directly above the protrusions 1320 may be indented. The indentations may be substantially the same size as the protrusions 1320. The indentation allows the ballast blocks to be stacked securely, so that the indentations of one ballast block 1314 receive the protrusions 1314 of an adjacent ballast block 1314. For example, the ballast blocks 1314 may be stacked in this manner during shipment to the installation site. In some implementations, the ballast blocks 1314 may also be stacked when they are installed.

Figure 13B:
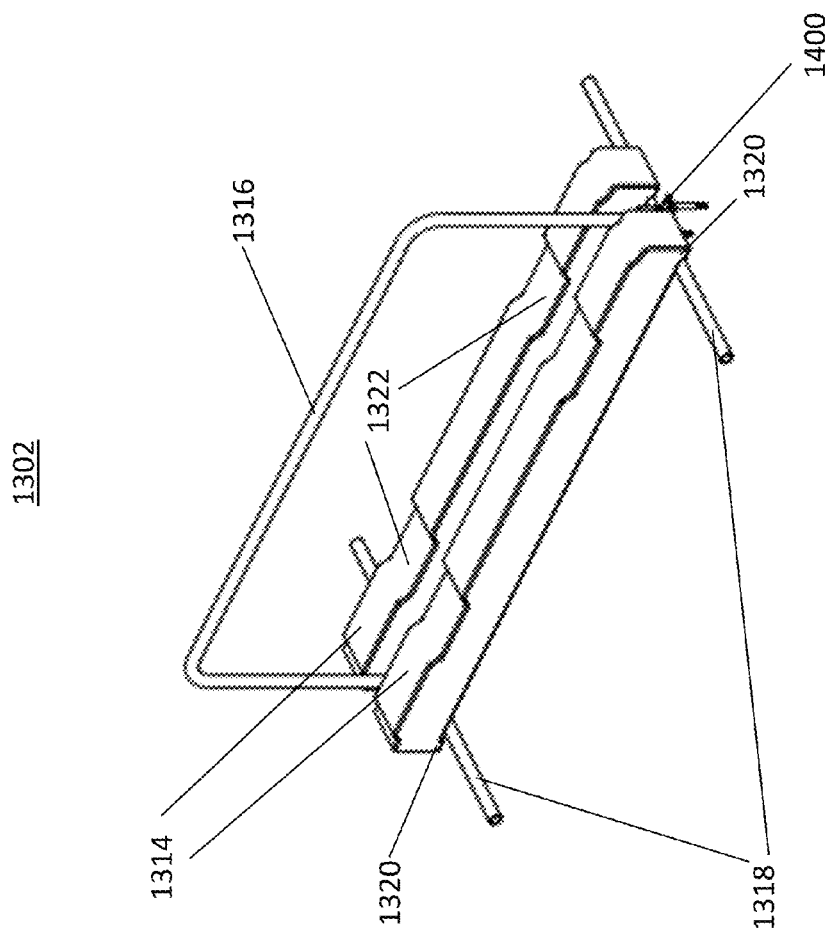
FIG. 13B is a perspective view of a second support structure for use in the module mount assembly of FIG. 12A.

Grooves 1322 are also formed in the top of the ballast blocks 1314 so that, if the ballast blocks are stacked prior to installation, spaces remain between adjacent ballast blocks at the location of the grooves 1322. The spaces can allow a worker to easily grasp a ballast block 1314 from the stack and position it in place over a support structure during installation of the module mount assembly. As shown in FIG. 13B, the interior support structure 1304 also includes anchors 1400, which attach to the structural member 1308 via holes 1312, and provide support for the structural member 1310. The anchor 1400 is described further below in connection with FIG. 14.

FIG. 13B is a perspective view of a support structure 1302 for use in the module mount assembly 1200 of FIG. 12A. In some implementations, the support structure shown in FIG. 13B can be used as either the front support structure 1302 or rear support structure 1306, both shown in FIG. 12A. For clarity, it is referred to herein as support structure 1302. The support structure 1302 occupies a smaller area of the mounting surface than the support structure 1304 shown in FIG. 13A. Therefore, using the support structure 1302 in the front and rear rows of the module mount assembly allows the module mount assembly to occupy less surface area. The support structure 1302 includes a vertical structural member

1316 and two horizontal structural members 1318. The horizontal structural members 1318 can be in contact with a substantially horizontal mounting surface when the support structure 1302 is installed. The structural members 1302 can be made from the same material as the structural members 1308 and 1310 shown in FIG. 13A. In some implementations, the structural members 1318 can interlock with the structural members 1308 of the interior support structure 1304 shown in FIG. 13A.

In some implementations, the height of the vertical structural member 1316 can be varied depending on whether the support structure 1302 is to be used in the front or rear of a module mount assembly. For example, as shown in FIG. 12C, the rear support structure can have a greater height than the front support structure. In this arrangement, the rear edge of each solar panel module is supported at a greater height than the front edge. The modules are therefore tilted at an angle that can be selected to increase the exposure to sunlight. For example, in implementations in which the module mount assembly is to be installed in the northern hemisphere with the rear support structure in a geographic North position, supporting the solar panel modules so that the rear edges are raised higher than the front edges can allow the modules to more directly face the sun during peak daylight hours. In some other implementations, the rear support structure can have a greater height than the front support structure, so that the solar panel modules are angled in the opposite direction, for example to expose the solar panel modules to more sunlight in a southern hemisphere installation setting. The support structure 1302 also includes two ballast blocks 1314 which can be placed over the horizontal structural members 1318 to hold the support structure securely on the mounting surface, as well as anchors 1400 for additional support.

Figure 14:
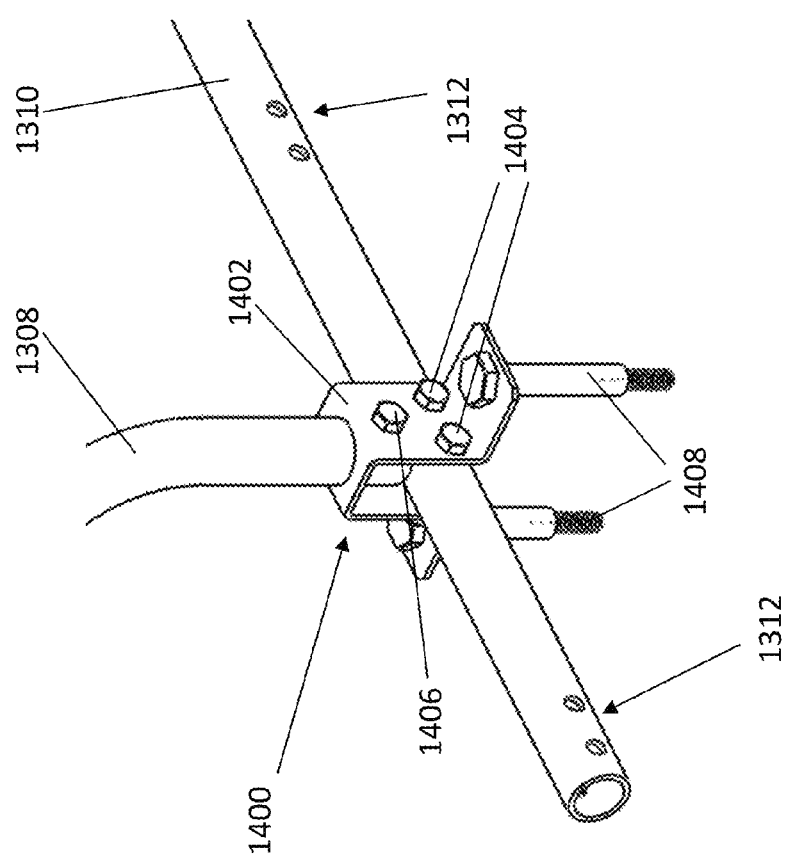
FIG. 14 is a perspective view of an anchor for use in the module mount assembly of FIG. 12A.

FIG. 14 is a perspective view of an anchor 1400 for use in the module mount assembly 1200 of FIG. 12A. For example, the anchor 1400 can be used as a mounting member to secure the support structures 1302, 1304, and 1306 of a module mount assembly to the mounting surface, such as a roof structure. The anchor 1400 of FIG. 14 is shown on the structural member 1310 of an interior support structure, such as the interior support structure 1304 shown in FIG. 13A. The anchor 1400 includes a bracket 1402, which is secured to the structural member 1310 by a pair of bolts 1404. In some implementations, the structural member 1310 can include multiple sets of holes 1312 through which the bolts 1404 may be secured. The position of the anchor may therefore be changed to accommodate various solar panel module sizes or angles of orientations, or to change the spacing of rows of support structures in a module mount assembly.

The bracket 1402 is also secured to the structural member 1308 by a bolt 1406. Two bolts 1408 can penetrate the mounting surface, thereby securing the bracket 1402 to the mounting surface, such as a concrete roof structure. In some implementations, the support structures may be stabilized only by ballast blocks, only by anchors 1400, or by a combination of ballast blocks and anchors 1400.

Figure 15A:
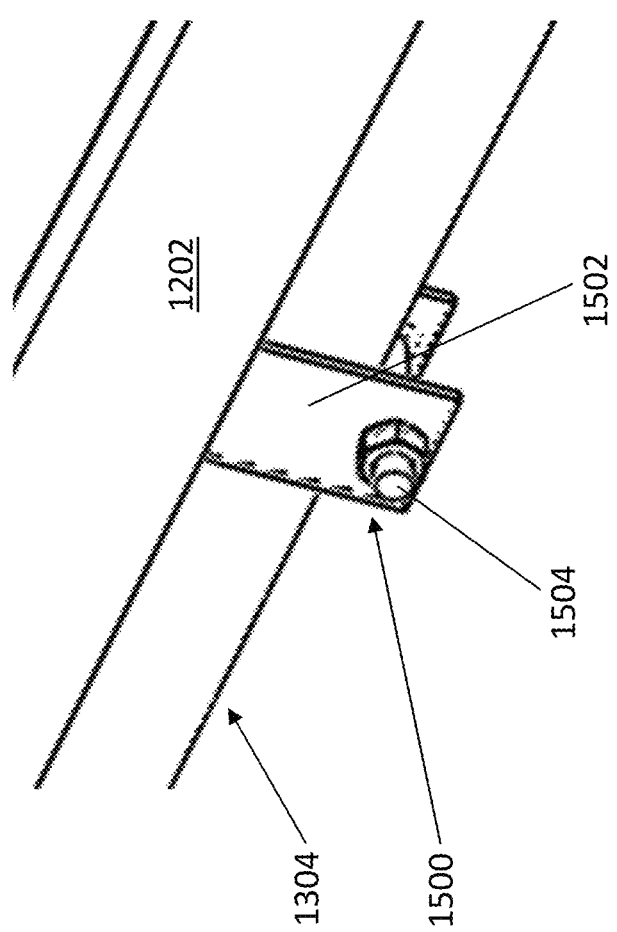
FIG. 15A is a perspective view of a claw assembly for use in the module mount assembly of FIG. 12A.
Figure 15B:
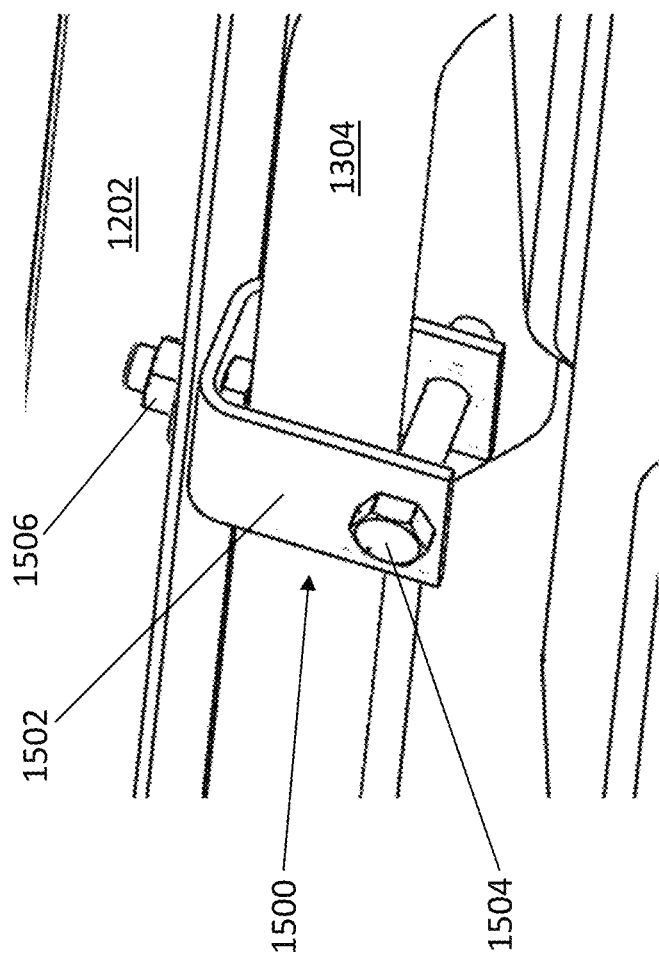
FIG. 15B is a second perspective view of the claw assembly of FIG. 15A.

FIG. 15A is a perspective view of a claw assembly 1500 for use in the module mount assembly 1200 of FIG. 1A. As discussed above in connection with FIG. 12D, the claw assembly 1500 can be used to secure a solar panel module 1202 to the module mount assembly 1200. The claw assembly 1500 includes a bracket 1502 and a bolt 1504. When installed, the bracket can be fitted around a the lateral portion of a support structure such as the interior support structure 1304, and the bolt 1504 can be tightened to secure the bracket 1500 to the lateral portion of the support structure 1304. FIG. 15B is a second perspective view of the claw assembly 1500 of FIG. 15A. As shown in FIG. 15B, the claw assembly 1500 also includes a second bolt 1506. The bolt 1506 can be used to secure the solar panel module 1202 to the bracket 1502. For example, the solar panel module can include a flange with a pre-drilled hole through which the bolt 1506 can be secured. When the bolts 1504 and 1506 are tightened, the solar panel module 1202 is fastened to the interior support structure 1304 by the claw assembly 1500.

Figure 16:
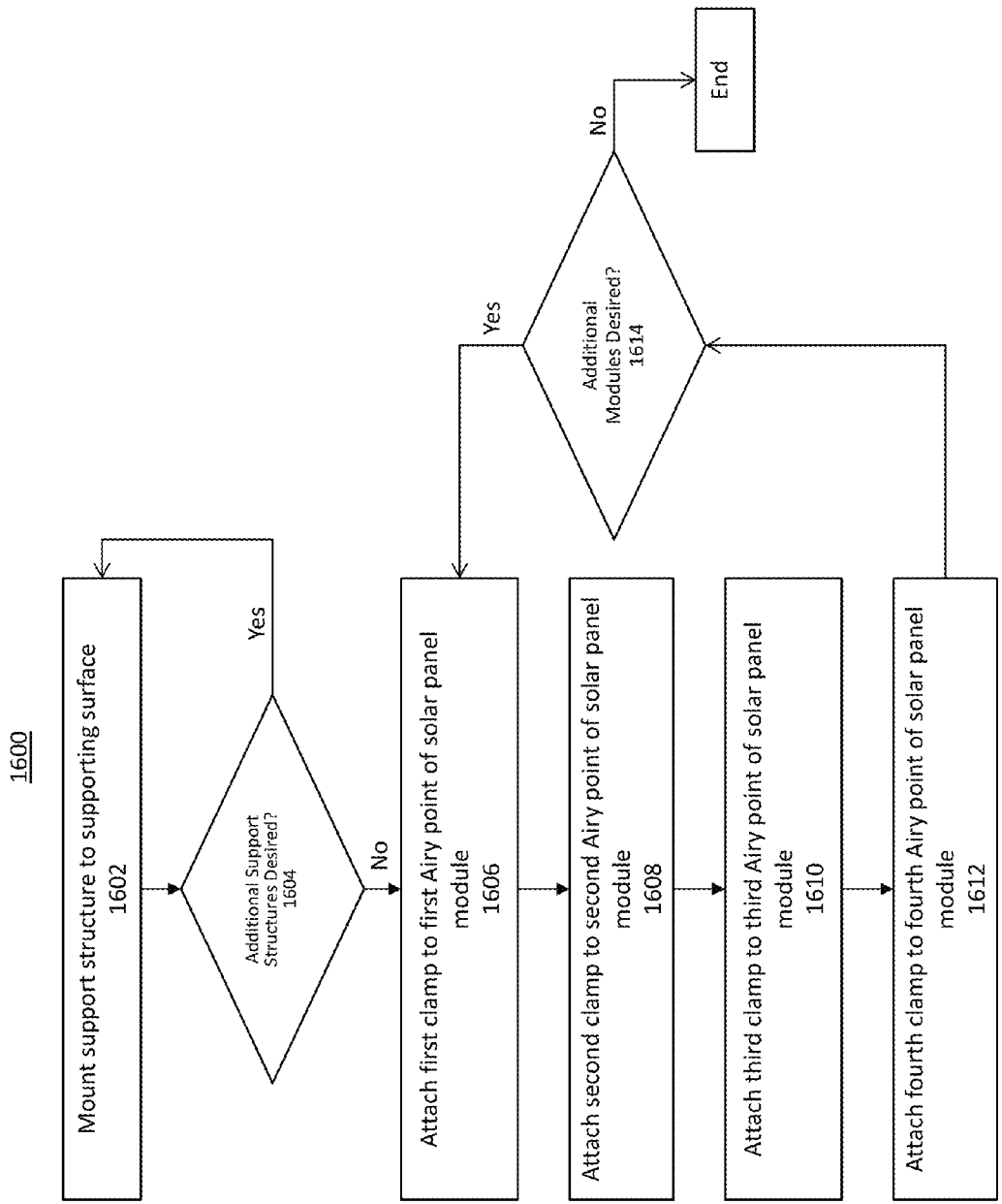
FIG. 16 is a block diagram of a process for supporting one or more solar panel modules above a surface.
Figure 17A:
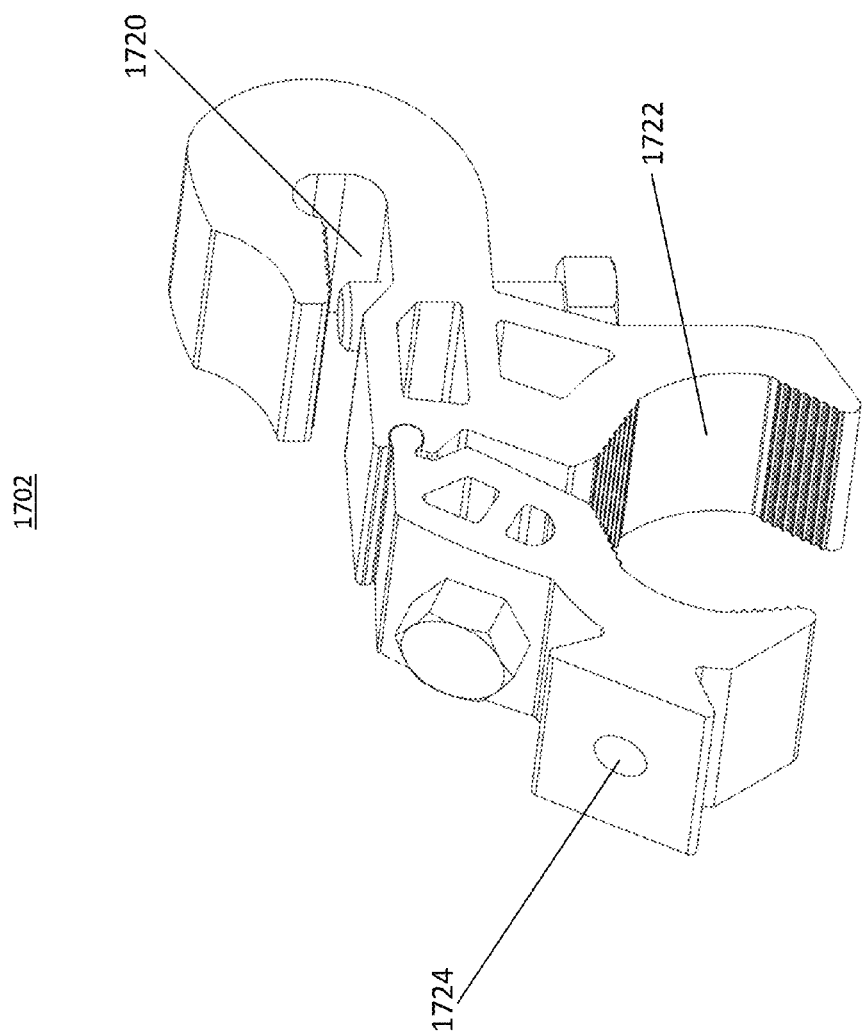
FIGS. 17A-17E show different embodiments of claw assemblies for securing solar panel modules and deflector elements to a support frame.
Figure 17B:
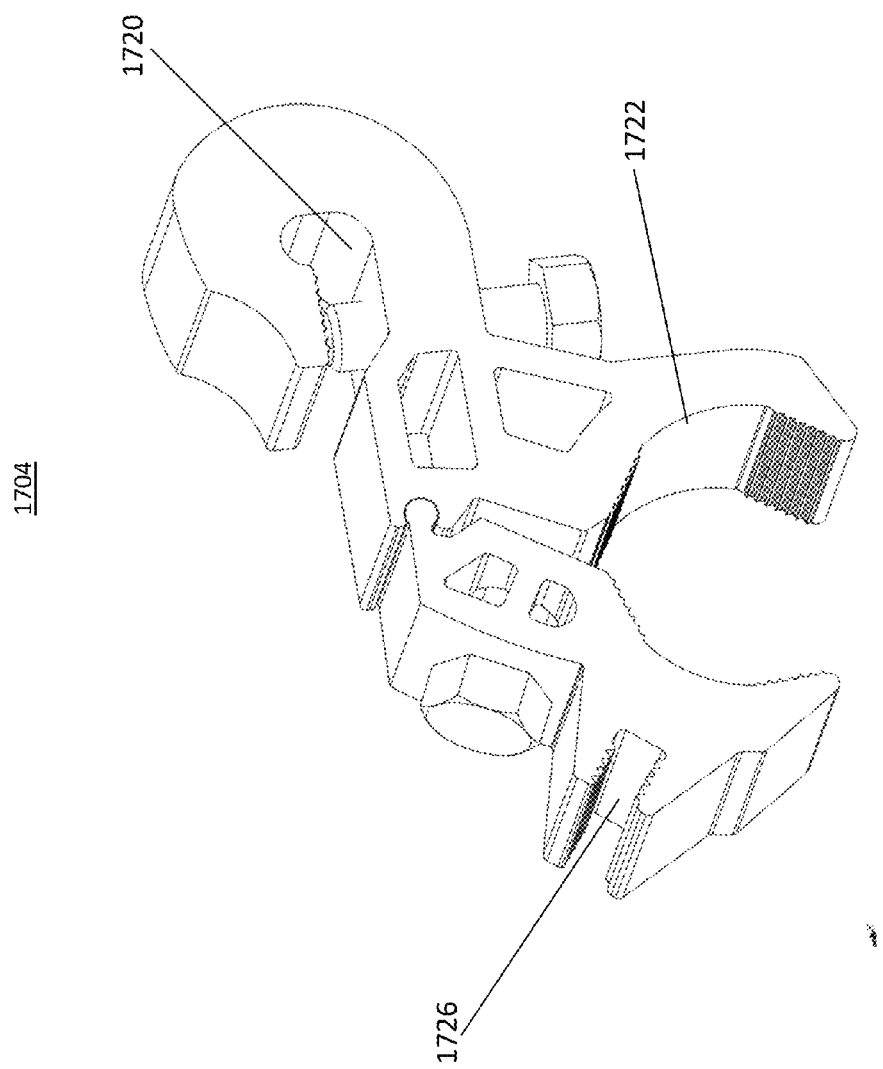
Figure 17C:
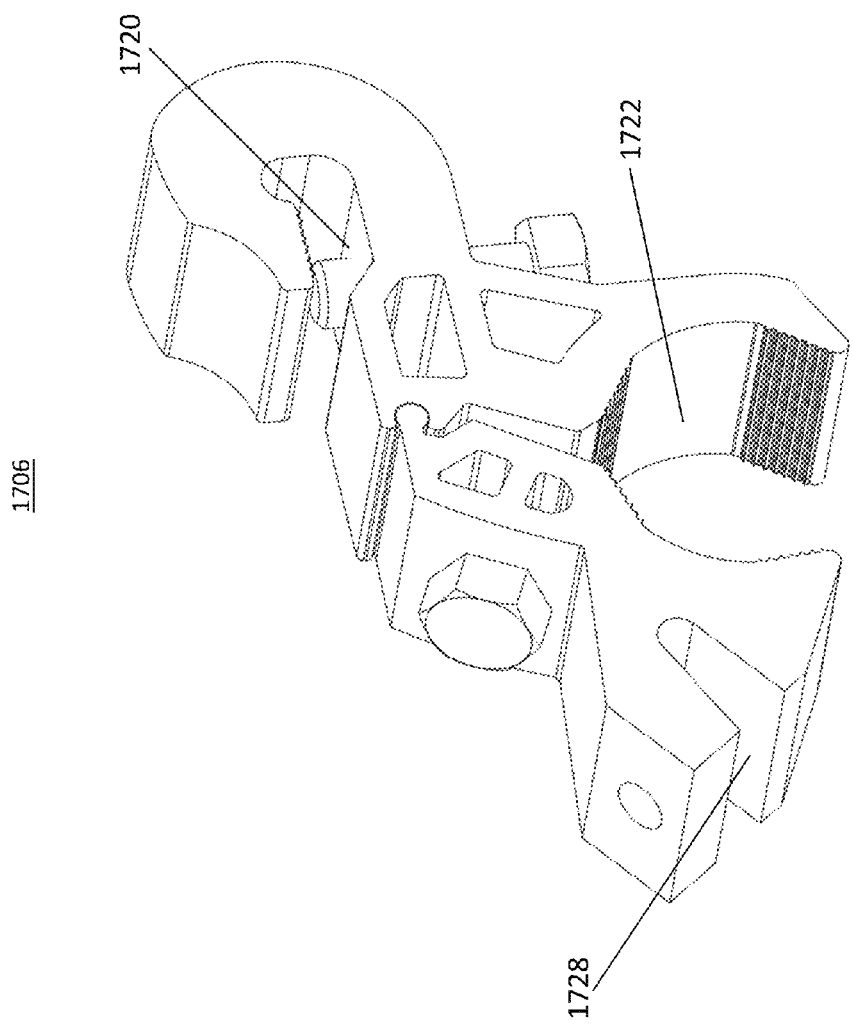
Figure 17D:
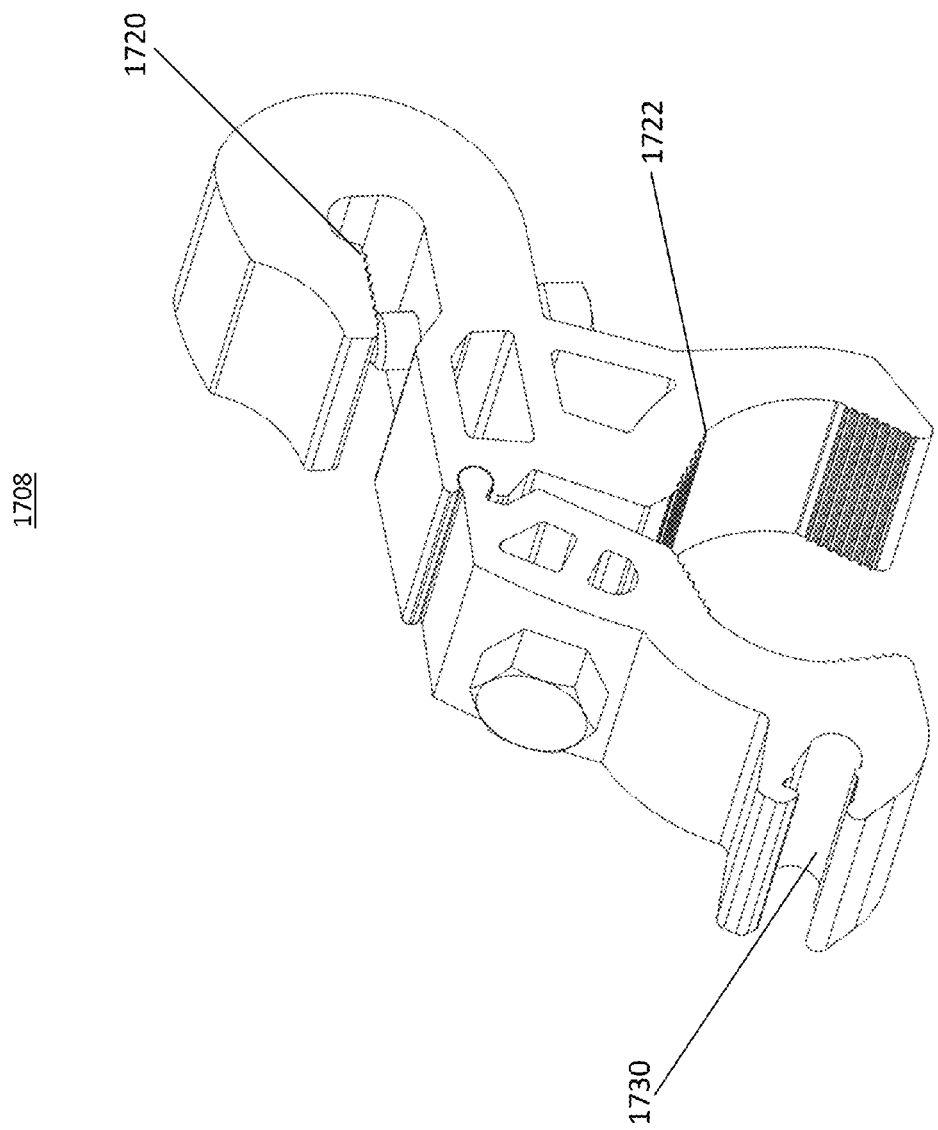
Figure 17E:
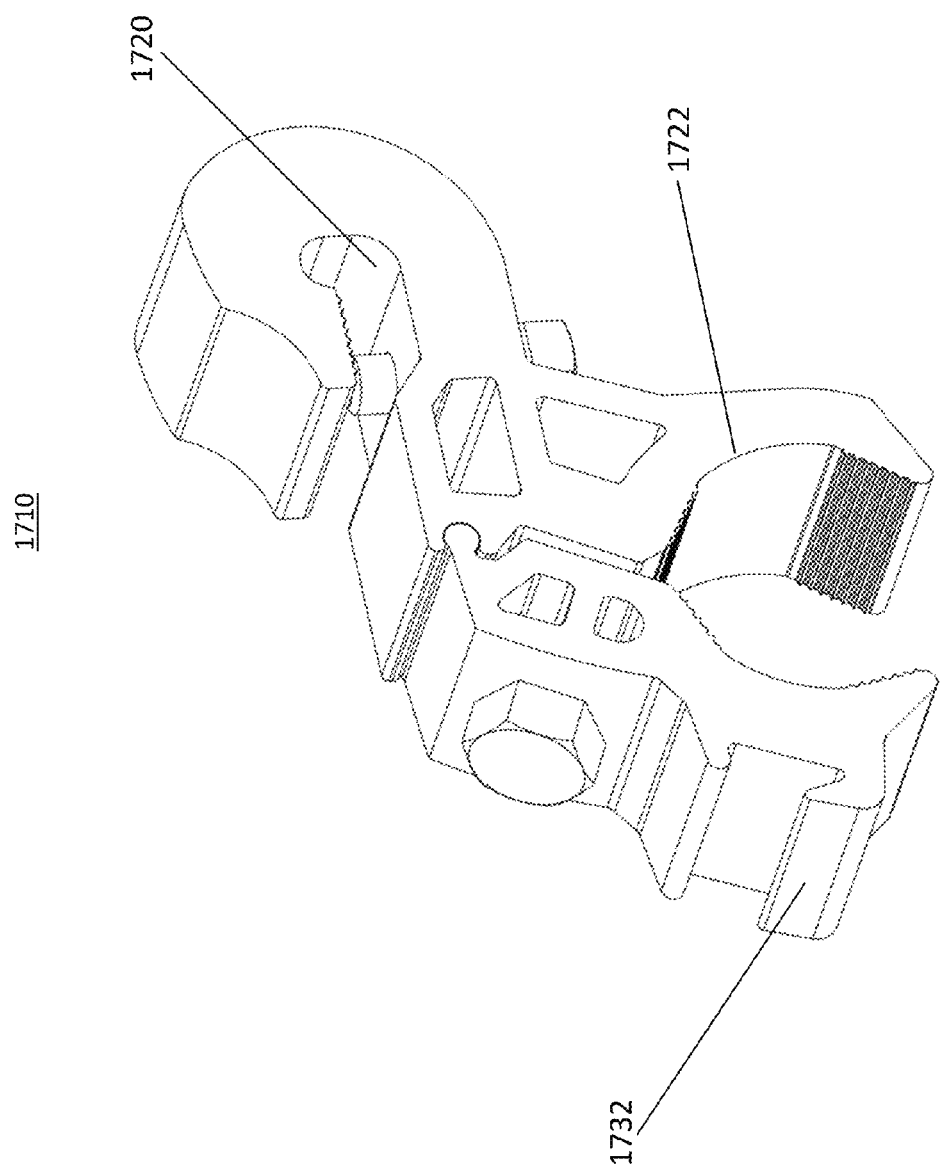

FIG. 16 is a block diagram of a process 1600 for deploying the module mount assembly to support one or more solar panel modules above a surface. In brief overview, the process 1600 includes mounting a support structure to a supporting surface (block 1602) and determining whether additional support structures are desired (block 1604). If additional support structures are desired, the process 1600 returns to block 1602 in which a support structure is mounted to the supporting surface. If not additional support structures are desired, the process 1600 includes moving a first clamp of a support structure to a first Airy point of a solar panel module (block 1606), attaching the first clamp to the first Airy point of the solar panel module (block 1608), moving a second clamp of a support structure to a second Airy point of the solar panel module (block 1610), attaching the second clamp to the second Airy point of the solar panel module (block 1612), and determining whether additional solar panel modules are desired (block 1614). If additional modules are desired, the process 1600 returns to block 1606 to repeat the steps for installing a module. If not additional modules are desired, the process 1600 is complete.

Referring again to FIG. 16, the process 1600 includes mounting a support structure to a supporting surface (block 1602). In some implementations, the support structure can include one of the support structures 1302, 1304, and 1306 shown in the module mount assembly 1200 of FIG. 12A. The supporting surface can include a substantially planar outdoor surface such as a roof or a portion of the ground. As discussed above, the support structures can include a plurality of structural members. In some implementations, these structural members may be delivered to the installation site separately. For example, a worker could assemble the separate structural members at the installation site to form the support structures. In other implementations, the support structures can be assembled prior to their delivery to the installation site. A support structure can be mounted to the supporting surface using a mounting member such as the anchor 1400 shown in FIGS. 13A and 13B. In some implementations, one or more ballast blocks such as the ballast block 1314 may also be used to secure the support structure to the supporting surface after it has been mounted.

The support structure may include a lateral support member extending laterally between two post members. In some implementations, the lateral support member can correspond to the lateral portion of the support members 1308 or 1310 shown in FIG. 13A, or the lateral portion of the support member 1316 shown in FIG. 13B. The lateral support member can be positioned at a predetermined height above the supporting surface and can extend along an axis. For example, if other support structures have been installed previously, the lateral support member of the support structure to be installed can be positioned substantially along the same axis as a lateral support member of a previously installed support structure. This arrangement can help to ensure that the solar panel modules are aligned in rows when mounted to the module support assembly.

Although the support structure can be mounted to the supporting surface so that the support structure is aligned with other support structures, the installation of each support structure can be carried out independently. Each support structure can be separated from the other support structures so that the support structures are not attached to each other during the mounting process and/or when mounted. The spacing between the support structures can be varied, as discussed above in connection with FIG. 12B. For example, the spacing of adjacent support structures in a given row may be adjusted in order to avoid obstacles on the mounting surface, such as chimneys or exhaust vents that may be present when the support structures are mounted on a roof. The spacing of adjacent support structures can be selected to ensure that the solar panel modules can still be mounted at their Airy points to the support structures. For example, the spacing of adjacent support structures can be chosen so that the maximum spacing of the support structures is less than the distance between Airy points on the solar panel module to be supported by the adjacent support structures.

The support structure mounted (block 1602) can be a front support structure 1302, a rear support structure 1306, or an interior support structure 1304 as shown in FIG. 12A. For example, the size of the solar panel array can be determined prior to installation of the array. The support structures can then be installed in rows to achieve a desired array size. When a support structure is mounted (block 1602) to the supporting surface, it can be determined whether the support structure is part of the front row, an interior row, or the rear row of support structures. If the support structure is part of the front or rear row, a support structure such as the support structure 1302 shown in FIG. 13B may be used. The support structure 1302 covers a smaller surface area than the interior support structure 1304 shown in FIG. 13A. As shown in FIG. 12A, each support structure in the front and rear rows only supports a single edge of a row of solar panel modules. Therefore, the smaller support structure 1302 is provides sufficient support while also reducing the footprint of the support structure assembly when used in the front and rear rows. Support structures used in interior rows can support one edge of a first row of solar panel modules and another edge of a second row of solar panel modules, as shown in FIG. 12A. Therefore, if it is determined that the support structure to be mounted is part of an interior row, a larger support structure having two lateral support members, such as the support structure 1304 shown in FIG. 13A may be selected.

The process 1600 includes determining whether additional support structures are needed or desired (block 1604). For example, in some implementations, a module mount assembly may include a large number of support structures. Each support structure may be mounted to the supporting surface independently. Therefore, if it is determined that additional support structures are required or desired to complete the module mount assembly, the process 1600 returns to block 1602 in which another support structure is mounted to the supporting surface. These steps can be repeated until it is determined that no additional support structures are necessary or desired.

Blocks 1606-1612 of the process 1600 describe the steps to install a single solar panel module. The process 1600 includes attaching a first clamp to a a first Airy point of a solar panel module (block 1606). The first clamp is configured to secure the solar panel module to a lateral support member of a support structure that has been mounted to the mounting surface as discussed above in the description of block 1602. In some implementations, the first clamp can be installed on a lateral support member of a support structure at the installation site before the lateral support member is attached to the first Airy point of the solar panel module. In other implementations, the first clamp can be pre-installed on a lateral support member of each support structure before the support structures are delivered to the installation site.

The first clamp can be configured to move along a length of the first lateral support member of the first support structure. For example, the first clamp can correspond to the claw assembly 1500 shown in FIGS. 15A and 15B. The first clamp can be loosely fixed to the lateral support member of the support structure so that the first clamp is captive on the lateral support member but allowed to slide along the length of the lateral support member. A technician may therefore slide the first clamp into a position along the lateral support member of the support structure corresponding to a first Airy point of the solar panel module to be supported. The position of the Airy points may be indicated visually on the solar panel module so that a technician can quickly locate the Airy points during installation. In some implementations, the solar panel module can include predrilled holes configured to receive a bolt or other attachment mechanism for attaching the clamp to the solar panel module. The predrilled holes may be located at the Airy points of the solar panel module, so that the clamp can be attached to the solar panel module only at the Airy points, thereby substantially preventing technician error in locating the Airy points.

After the first clamp has been positioned at the first Airy point, the first clamp is attached to the first Airy point of the solar panel module. In some implementations, the clamp may be attached to the first Airy point of the solar panel module by a mechanical joint, such as a rivet, a bolt, a screw, or a nail. In other implementations, the clamp may be welded to the Airy point of the solar panel module. For example, the clamp may be attached by a bolt such as the bolt 1506 shown securing the clamp 1500 to the solar panel module 1202 in FIG. 15B. In some implementations, the clamp may also be secured to the first lateral support member of the first support structure so that the solar panel module is held at a fixed location along the length of the lateral support member. In other implementations, the solar panel module and clamp may be permitted to slide along the length of the lateral support member.

The process 1600 includes attaching a second clamp to a second Airy point of a solar panel module (block 1608). The second clamp is configured to secure the solar panel module to a lateral support member of a support structure that has been mounted to the mounting surface as discussed above in the description of block 1602. The second clamp may be used to secure the solar panel module to a different support structure than was used with the first clamp. In some implementations, the second clamp can be installed on a lateral support member of a support structure at the installation site before the second clamp is attached to the first Airy point of the solar panel module. In other implementations, the second clamp can be pre-installed on a lateral support member of each support structure before the support structures are delivered to the installation site.

The second clamp can be configured to move along a length of the lateral support member of the support structure. For example, the second clamp can correspond to the claw assembly 1500 shown in FIGS. 15A and 15B. The second clamp can be loosely fixed to the lateral support member of the support structure so that the second clamp is captive on the lateral support member but allowed to slide along the length of the lateral support member. A technician may therefore slide the second clamp into a position along the lateral support member of the support structure corresponding to a second Airy point of the solar panel module to be supported. The second Airy point can be chosen along the same edge of the solar panel module as the first Airy point, so that the first and second Airy points are equidistant from the ends of the solar panel module along a given edge. The position of the Airy points may be indicated visually on the solar panel module so that a technician can quickly locate the Airy points during installation. In some implementations, the solar panel module can include predrilled holes configured to receive a bolt for attaching the clamp to the solar panel module. The predrilled holes may be located at the Airy points of the solar panel module, so that the clamp can be attached to the solar panel module only at the Airy points, thereby substantially preventing technician error in locating the Airy points.

After the second clamp has been positioned at the second Airy point, the second clamp is attached to the second Airy point of the solar panel module. In some implementations, the clamp may be attached to the second Airy point of the solar panel module by a mechanical joint, such as a rivet, a bolt, a screw, or a nail. In other implementations, the clamp may be welded to the Airy point of the solar panel module. For example, the clamp may be attached by a bolt such as the bolt 1506 shown securing the clamp 1500 to the solar panel module 1202 in FIG. 15B. In some implementations, the clamp may also be secured to the lateral support member of the support structure so that the solar panel module is held at a fixed location along the length of the lateral support member. In other implementations, the solar panel module and second clamp may be permitted to slide along the length of the lateral support member. At least a portion of the solar panel module can therefore be supported above the supporting surface by the first and lateral support members. For example, as discussed above, the first and second clamps can be configured to support a solar panel module at first and second Airy points along the same edge of the solar panel module. Therefore, after the second clamp is attached as described in connection with block 1608 of the process 1600, that edge of the solar panel module will be supported above the supporting surface. An opposing edge of the solar panel module can be supported at its airy points by a third clamp and a fourth clamp, as described further below.

The process 1600 includes attaching a third clamp to a third Airy point of a solar panel module (block 1610). The third clamp is configured to secure the solar panel module to a lateral support member of a support structure that has been mounted to the mounting surface, as discussed above in the description of block 1602. The third clamp may be used to secure the solar panel module to a different support structure than was used with the first clamp or the second clamp.

In some implementations, the third clamp can be installed on a lateral support member of a support structure at the installation site before the third clamp is attached to the third Airy point of the solar panel module. In other implementations, the third clamp can be pre-installed on a lateral support member of each support structure before the support structures are delivered to the installation site.

The third clamp can be configured to move along a length of a lateral support member of the support structure. For example, the third clamp can correspond to the claw assembly 1500 shown in FIGS. 15A and 15B. The clamp can be loosely fixed to the lateral support member of the support structure so that the clamp is captive on the lateral support member but allowed to slide along the length of the lateral support member. A technician may therefore slide the clamp into a position along the lateral support member of the support structure corresponding to a third Airy point of the solar panel module to be supported. The position of the Airy points may be indicated visually on the solar panel module so that a technician can quickly locate the Airy points during installation. In some implementations, the solar panel module can include predrilled holes configured to receive a bolt or other attachment mechanism for attaching the clamp to the solar panel module. The predrilled holes may be located at the Airy points of the solar panel module, so that the clamp can be attached to the solar panel module only at the Airy points, thereby substantially preventing technician error in locating the Airy points.

After the third clamp has been positioned at the third Airy point, the third clamp is attached to the third Airy point of the solar panel module. In some implementations, the clamp may be attached to the third Airy point of the solar panel module by a mechanical joint, such as a rivet, a bolt, a screw, or a nail. In other implementations, the clamp may be welded to the Airy point of the solar panel module. For example, the clamp may be attached by a bolt such as the bolt 1506 shown securing the clamp 1500 to the solar panel module 1202 in FIG. 15B. In some implementations, the clamp may also be secured to the lateral support member of the support structure so that the solar panel module is held at a fixed location along the length of the lateral support member. In other implementations, the solar panel module and third clamp may be permitted to slide along the length of the lateral support member.

The process 1600 includes attaching a fourth clamp to a fourth Airy point of a solar panel module (block 1612). The fourth clamp is configured to secure the solar panel module to a lateral support member of a support structure that has been mounted to the mounting surface as discussed above in the description of block 1602. The fourth clamp may be used to secure the solar panel module to a different support structure than was used with the first clamp, the second clamp, or the third clamp. In some implementations, the fourth clamp can be installed on a lateral support member of a support structure at the installation site before the fourth clamp is attached to the fourth Airy point of the solar panel module. In other implementations, the fourth clamp can be pre-installed on a lateral support member of each support structure before the support structures are delivered to the installation site.

The fourth clamp can be configured to move along a length of the lateral support member of the support structure. For example, the fourth clamp can correspond to the claw assembly 1500 shown in FIGS. 15A and 15B. The fourth clamp can be loosely fixed to the lateral support member of the support structure so that the fourth is captive on the lateral support member but allowed to slide along the length of the lateral support member. A technician may therefore slide the fourth clamp into a position along the lateral support member of the support structure corresponding to a fourth Airy point of the solar panel module to be supported. The fourth Airy point can be chosen along the same edge of the solar panel module as the third Airy point, so that the third and fourth Airy points are equidistant from the ends of the solar panel module along an edge that is opposed to the edge that includes the first and second Airy points, as described above. The position of the Airy points may be indicated visually on the solar panel module so that a technician can quickly locate the Airy points during installation. In some implementations, the solar panel module can include predrilled holes configured to receive a bolt for attaching the clamp to the solar panel module. The predrilled holes may be located at the Airy points of the solar panel module, so that the clamp can be attached to the solar panel module only at the Airy points, thereby substantially preventing technician error in locating the Airy points.

After the fourth clamp has been positioned at the fourth Airy point, the fourth clamp is attached to the fourth Airy point of the solar panel module. In some implementations, the clamp may be attached to the fourth Airy point of the solar panel module by a mechanical joint, such as a rivet, a bolt, a screw, or a nail. In other implementations, the clamp may be welded to the Airy point of the solar panel module. For example, the clamp may be attached by a bolt such as the bolt 1506 shown securing the clamp 1500 to the solar panel module 1202 in FIG. 15B. In some implementations, the clamp may also be secured to the lateral support member of the support structure so that the solar panel module is held at a fixed location along the length of the lateral support member. In other implementations, the solar panel module and fourth clamp may be permitted to slide along the length of the lateral support member. At least a portion of the solar panel module can therefore be supported above the supporting surface by the third and fourth lateral support members. For example, as discussed above, the third and fourth clamps can be configured to support a solar panel module at third and fourth Airy points along an edge of the solar panel module opposed to the edge that is supported by the first and second clamps. Therefore, after the fourth clamp is attached as described in connection with block 1612 of the process 1600, that edge of the solar panel module will be supported above the supporting surface, while the opposing edge of the solar panel module supported at the first and second Airy points by the first clamp and the second clamp.

The process 1600 includes determining whether additional solar panel modules are needed or desired to complete the installation (block 1614). For example, an array may include many solar panel modules, each of which can be installed on the support structures independently. If it is determined that additional modules are needed or desired, the process 1600 returns to block 1606 to begin the installation for the next solar panel module. If no additional modules are needed or desired, the process 1600 is complete.

FIGS. 17A-17E show implementations of claw assemblies 1702-1710 for securing solar panel modules and deflector elements to a solar panel module mounting system. For example, the claw assemblies 1702-1710 can be used to secure the solar panel modules 201 and deflector elements 502 to the support structures 501, as shown in the solar panel module mounting system 500 of FIGS. 5A and 5B. Each of the claw assemblies 1702-1710 includes a first clamp 1720 for securing a solar panel module and a second clamp 1722 configured to secure the respective claw assembly to a support structure. The clamps 1720 and 1722 are secured by bolts.

The claw assembly 1702 includes a tapped hole 1724 for securing a deflector element. For example, a deflector element can be aligned against the claw assembly 1702, and a bolt can be inserted into the tapped hole 1724 to secure the deflector element. Similarly, the claw assembly 1704 includes extruded threads into which a bolt can be tightened, thereby securing a deflector element. The claw assembly 1706 includes a pinch bolt feature 1728 for securing a deflector element.

The claw assembly 1708 includes a click-lock feature 1730, into which a deflector element can be inserted securely. The click-lock feature 1730 does not require an additional loose fastener, such as a bolt, to secure a deflector element. Similarly, the claw assembly 1710 includes a hook feature 1732 that is configured to support a deflector element without the need for a loose fastener.

Figure 18:
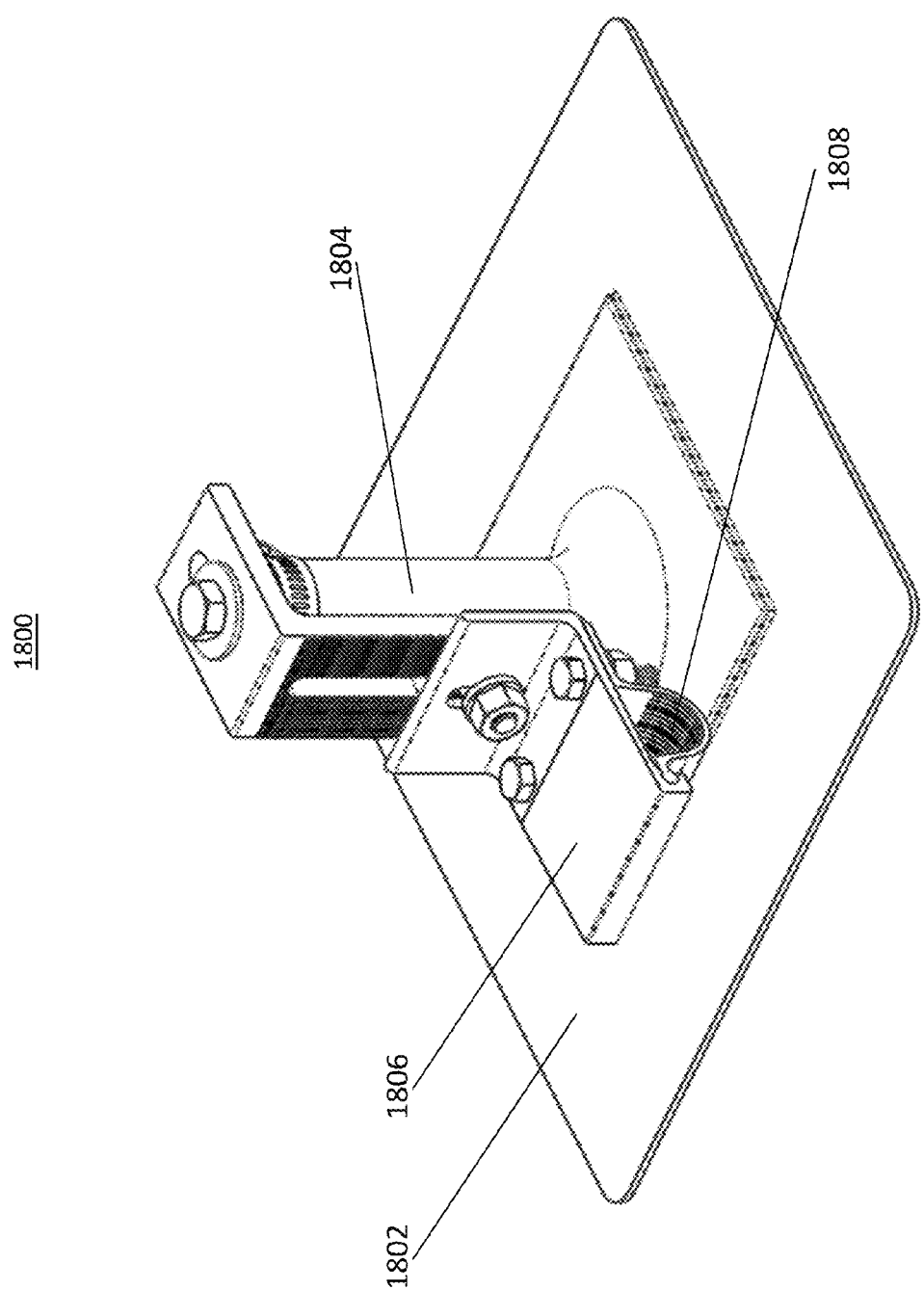
FIG. 18 shows an embodiment of a foundational component for use with a solar panel mounting system.

FIG. 18 shows an implementation of a foundational component 1800 for use with a solar panel mounting system. The support 1800 includes a platform 1802, a support component 1804, and a bracket 1806. The foundational component 1802 can be mounted on the surface supporting the solar panel mounting system, such as a roof structure or the ground. In some implementations, the platform 1802 is substantially planar and has a large surface area in contact with the supporting surface for increased stability. This can be particularly advantageous in areas having high seismic activity, for example. The support component 1804 extends substantially perpendicular from the platform 1802. The bracket 1806 is mounted to the support structure 1804. The bracket 1806 includes a tubular opening 1808 for supporting a portion of a solar panel mounting system, such as the solar panel mounting system 500 shown in FIGS. 5A and 5B. For example, a tubular component of the solar panel mounting system 500 can be inserted into the tubular opening 1808 so that the tubular component remains supported above the platform 1802. In some implementations, the height of the clamp 1806 along the support component 1804 is adjustable.

Figure 19:
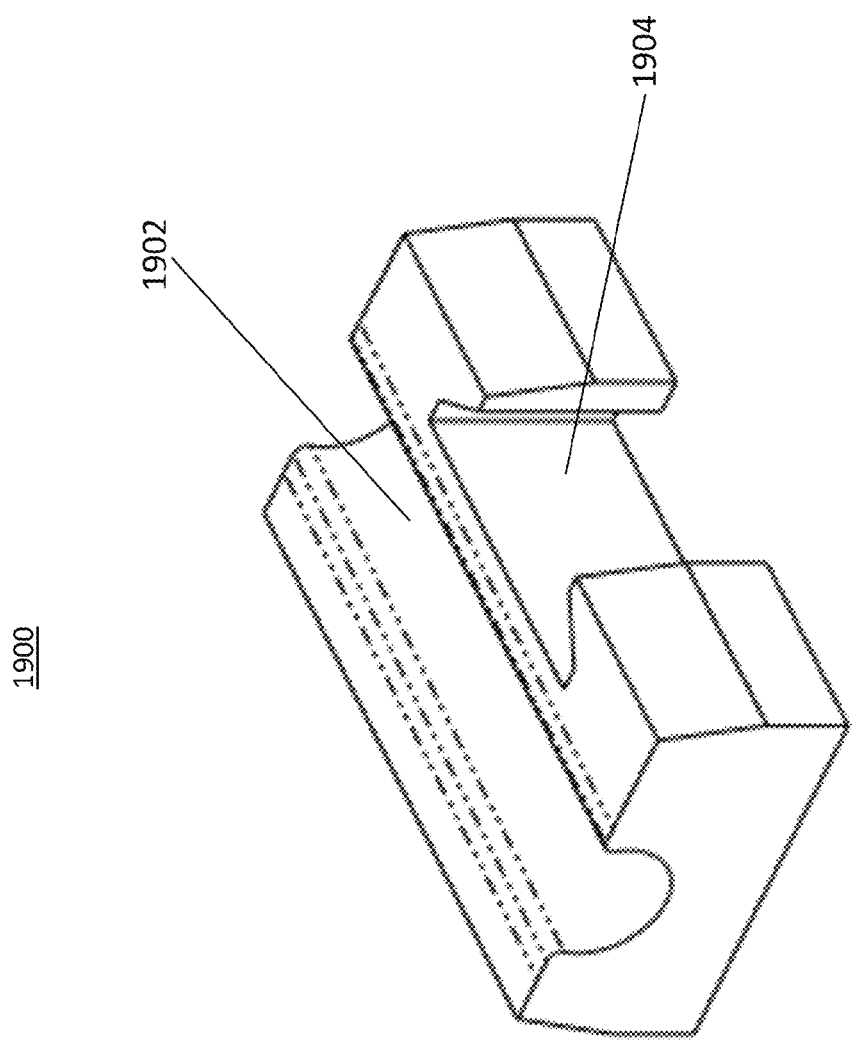
FIG. 19 shows a second embodiment of a foundational component for use with a solar panel mounting system.

FIG. 19 shows another implementation of a foundational component 1900 for use with a solar panel mounting system. The foundational component 1900 includes a flat bottom portion in contact with the supporting surface, such as a roof or a portion of the ground. The foundational component 1900 also includes a tubular channel 1902 for supporting a portion of a solar panel mounting system, such as the solar panel mounting system 500 shown in FIGS. 5A and 5B. For example, a tubular component of the solar panel mounting system 500 can be placed into the tubular channel 1902 so that the tubular component remains supported above the supporting surface. A cutout 1904 provides an interlocking mechanism for instances in which additional foundational components are to be placed adjacent to the foundational component 1900. In some implementations, the foundational component 1900 can be formed from rubber.

Figure 20:
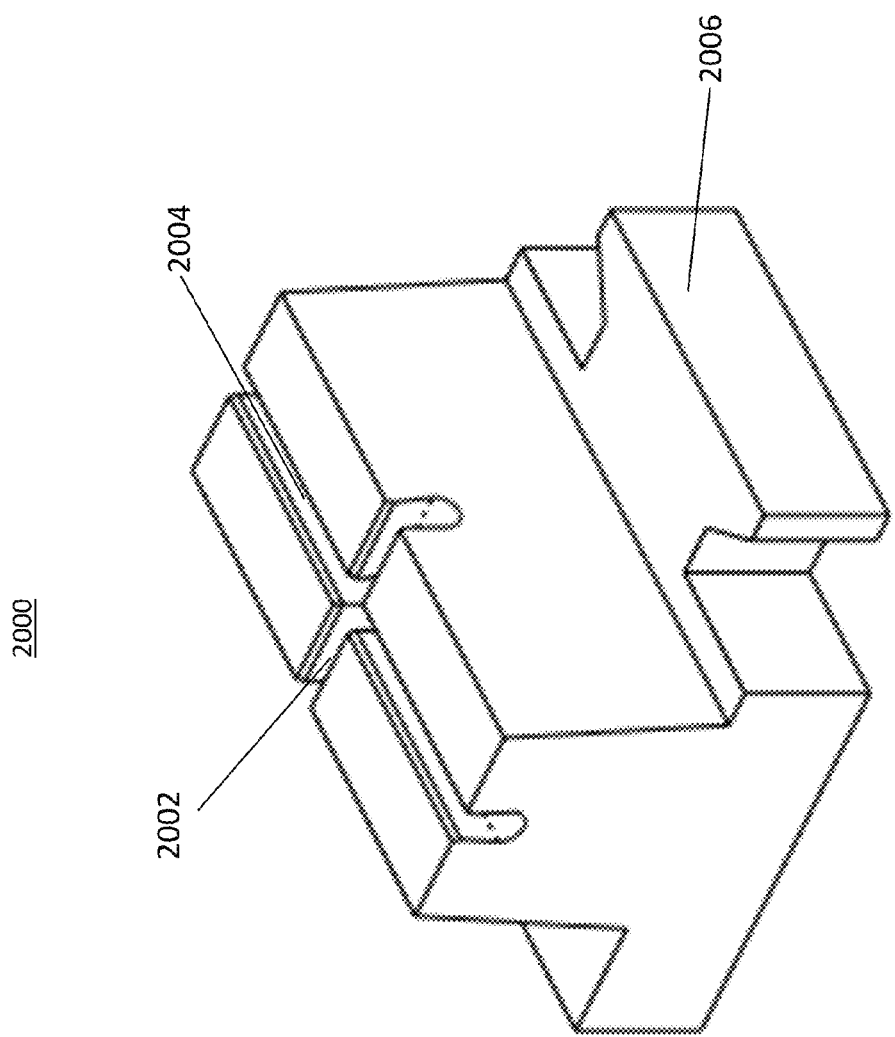
FIG. 20 shows a wire management component for use with a solar panel mounting system.

FIG. 20 shows a wire management component 2000 for use with a solar panel mounting system. The wire management component 2000 includes a first channel 2002 and a second channel 2004. The channels 2002 and 2004 are arranged at a right angle with respect to one another and are configured to received wires associated with a solar panel mounting system. For example, wires can be inserted into the channels 2002 and 2004 to hold the wires in place. The wire management component 2006 also includes an interlocking feature 2006, which can be used, for example, to interlock with the cutout 1904 of the foundational component 1900 shown in FIG. 19. In some implementations, the wires inserted into the channels 2002 and 2004 can carry current generated by the solar panel modules. In other implementations, the wires inserted into the channels 2002 and 2004 can be used to ground the array of solar panel modules and the mounting assembly. For example, the modules and the mounting assembly can be made from conductive materials. Conductive wires can be electrically connected to the modules and to the mounting system. The wires can then be inserted in channels 2002 and 2004 and routed to earth ground. In some implementations, the wires may be electrically connected to earth ground through a conductive anchor, such as the anchor 1400 shown in FIG. 14.

Various examples have been given for devices, systems and methods for mounting solar modules. As used herein, the term solar module refers to a complete, environmentally protected unit designed to generate power when exposed to sunlight and comprising one or more solar cells and, optionally, optics and/or other components (typically exclusive of a tracker). A solar cell is a photovoltaic device that generates electricity when exposed to light. However, some embodiments may be used for mounting solar modules or arrays or solar modules, where the term solar modules refers to collection of modules mechanically fasten together, wired, and designed to provide a field-installable unit. Various embodiments may be used to mount any other suitable devices (e.g. mirrors, heat tubes, thermoelectric devices, optical devices, etc.).

It is to be noted that the above definitions of solar module, solar cell, and solar module are consistent with Article 690 of the National Electrical Code published in 2005 by the National Fire Protection Association. However, in the art, these terms are sometimes used interchangeable or imprecisely. It is to be understood that various embodiments of the devices, systems and methods described herein may be used to mount any suitable devices including solar module, solar cell, and solar module or combinations thereof.

It is to be understood that thermal grown compensators and related systems and techniques described herein may be used for thermal compensation in a variety of applications, including those outside of the field of solar module mounting. For example, thermal growth compensators of the type described herein may be incorporated in optical systems (e.g., optical mounts, cameras, telescopes, etc.). Thermal growth compensators of the type described herein may be incorporated buildings, bridges, or other structures.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive possibilities (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system for mounting a solar panel module above a surface, the system comprising:
   a first support structure and a second support structure, each of the first support structure and the second support structure comprising:

a lateral support member extending laterally between two post members, the lateral support member configured to support a first portion of a solar panel module; and a claw assembly having a first clamp positioned at a first end of the claw assembly and configured to attach the solar panel module to the claw assembly, a second clamp positioned at a second end of the claw assembly opposite the first end and configured to movably attach the claw assembly to the lateral support member such that the claw assembly can move along a length of the lateral support member, and a wind deflector attachment mechanism positioned at the second end of the claw assembly and configured to attach the wind deflector to the claw assembly;

wherein the claw assembly of the first support structure is configured to be moved to a first Airy point of the solar panel module and the claw assembly of the second support structure is configured to be moved to a second Airy point of the solar panel module.

2. The system of claim 1, wherein each claw assembly further comprises:

a first bolt configured to secure the solar panel module to the first clamp of the claw assembly; and a second bolt configured to secure the second clamp of the claw assembly to the lateral support member of a respective support structure.

3. The system of claim 1, wherein each claw assembly further comprises a third bolt configured to secure the wind deflector to the claw assembly and to provide an electrical path to ground through the wind deflector.

4. The system of claim 3, wherein each claw assembly further comprises a tapped hole configured to receive the third bolt.

5. A method for supporting a solar panel module above a surface, the method comprising:

mounting a first support structure to a supporting surface, the first support structure including a first lateral support member extending laterally between two post members;

mounting a second support structure to the supporting surface, the second support structure including a second lateral support member extending laterally between two post members;

moving a first claw assembly including a first clamp attached to the first lateral support member of the first support structure to a first Airy point of a solar panel module, the first claw assembly configured to move along a length of its respective lateral support member;

attaching a second clamp of the first claw assembly to the first Airy point of the solar panel module to have the first lateral support member support at least a portion of the solar panel module;

moving a second claw assembly including a third clamp attached to the second lateral support member of the second support structure to a second Airy point of the solar panel module, the second claw assembly configured to move along a length of its respective lateral support member; and attaching a fourth clamp of the second claw assembly to the second Airy point of the solar panel module to have the second lateral support member support at least a portion of the solar panel module.

6. The method of claim 5, wherein the first claw assembly includes a wind deflector attachment mechanism, the method further comprising:

attaching a wind deflector to the first claw assembly using the wind deflector attachment mechanism.

7. The method of claim 6, wherein attaching the wind deflector to the wind deflector attachment mechanism of the first claw assembly comprises inserting a bolt through the wind deflector attachment mechanism and the wind deflector to secure the wind deflector to the wind deflector attachment mechanism.

* * * * *